(12) United States Patent
Rommer et al.

(10) Patent No.: US 11,659,462 B2
(45) Date of Patent: May 23, 2023

(54) METHODS AND APPARATUSES FOR SELECTING A SESSION MANAGEMENT ENTITY FOR SERVING A WIRELESS COMMUNICATION DEVICE

(71) Applicant: Telefonaktiebolaget LM Ericsson (publ), Stockholm (SE)

(72) Inventors: Stefan Rommer, Västra Frölunda (SE); Qian Chen, Mölndal (SE); Patrik Dannebro, Hisings Kärra (SE); Åsa Larsen, Hisings Backa (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 73 days.

(21) Appl. No.: 16/960,430

(22) PCT Filed: Jan. 8, 2018

(86) PCT No.: PCT/EP2018/050337
§ 371 (c)(1),
(2) Date: Jul. 7, 2020

(87) PCT Pub. No.: WO2019/134754
PCT Pub. Date: Jul. 11, 2019

(65) Prior Publication Data
US 2020/0344655 A1 Oct. 29, 2020

(51) Int. Cl.
*H04W 36/12* (2009.01)
*H04W 76/36* (2018.01)
(Continued)

(52) U.S. Cl.
CPC .......... *H04W 36/12* (2013.01); *H04W 48/18* (2013.01); *H04W 76/36* (2018.02); *H04W 88/14* (2013.01); *H04W 84/042* (2013.01)

(58) Field of Classification Search
CPC ..... H04W 36/12; H04W 36/00; H04W 36/14; H04W 36/0016; H04W 36/0022;
(Continued)

(56) References Cited

U.S. PATENT DOCUMENTS

| 9,131,473 B2 | 9/2015 | Wang et al. |
| 2011/0007671 A1* | 1/2011 | Yu .......................... H04L 61/60 370/255 |

(Continued)

FOREIGN PATENT DOCUMENTS

| CN | 1930813 A | 3/2007 |
| WO | 2015135269 A1 | 9/2015 |

OTHER PUBLICATIONS

Author Unknown, "Technical Specification Group Services and System Aspects; System Architechture for the 5G System; Stage 2 (Release 15)," 3GPP TS 23.501, Version 1.6.0, Dec. 2017, 3GPP Organizational Partners, 184 pages.

(Continued)

*Primary Examiner* — Un C Cho
*Assistant Examiner* — Rasha K Fayed
(74) *Attorney, Agent, or Firm* — Withrow & Terranova, PLLC

(57) ABSTRACT

Disclosed is a method and access management entity for selecting a session management (SM) entity for serving a wireless communication device (WCD) in a core network that comprises an access management entity serving the WCD and an anchor SM entity that controls a first user plane entity that handles a data session associated with the WCD in a first domain, and a second SM entity for controlling a second user plane entity in a second domain of the core network. The method is performed by the access management entity and comprises selecting—based on WCD information and SM domain information—the second SM entity (Continued)

as an additional intermediate SM entity to control a user plane entity in the second domain for handling the data session in the second domain; requesting the second SM entity to act as the additional intermediate SM; and receiving a session response message.

21 Claims, 11 Drawing Sheets

(51) Int. Cl.
  *H04W 48/18* (2009.01)
  *H04W 88/14* (2009.01)
  *H04W 84/04* (2009.01)

(58) Field of Classification Search
  CPC ..... H04W 76/36; H04W 76/25; H04W 76/12; H04W 76/10; H04W 76/15; H04W 76/11; H04W 48/18; H04W 48/16; H04W 88/14; H04W 88/16; H04W 80/10; H04W 80/045; H04W 8/08; H04W 8/02; H04W 8/18; H04W 8/14; H04W 8/06; H04W 8/065; H04W 60/00; H04W 60/04; H04W 12/08; H04W 72/048; H04W 28/16; H04W 28/24; H04W 4/60; H04W 4/50; H04L 69/167; H04L 63/0876; H04L 63/0892; H04L 12/1407; H04L 12/06; H04L 12/28; H04L 29/12207; H04L 29/12792; H04L 61/60; H04L 61/20; H04L 61/2015; H04L 61/6086; H04L 61/2007; H04M 15/66
  See application file for complete search history.

(56) References Cited

U.S. PATENT DOCUMENTS

| | | | |
|---|---|---|---|
| 2017/0303259 A1* | 10/2017 | Lee | H04W 28/16 |
| 2018/0192390 A1* | 7/2018 | Li | H04W 16/04 |
| 2018/0198867 A1* | 7/2018 | Dao | H04W 76/30 |
| 2018/0295659 A1* | 10/2018 | Shan | H04W 76/12 |
| 2018/0376444 A1* | 12/2018 | Kim | H04W 4/70 |
| 2019/0124508 A1* | 4/2019 | Watfa | H04L 63/0876 |
| 2019/0182875 A1* | 6/2019 | Talebi Fard | H04W 72/04 |
| 2019/0208572 A1* | 7/2019 | Wang | H04L 61/1511 |
| 2019/0313479 A1* | 10/2019 | Myhre | H04L 67/1004 |
| 2020/0120589 A1* | 4/2020 | Velev | H04W 60/04 |
| 2020/0170055 A1* | 5/2020 | Dou | H04W 76/22 |
| 2020/0196382 A1* | 6/2020 | Kawasaki | H04L 29/08 |
| 2020/0213912 A1* | 7/2020 | Shi | H04W 36/12 |
| 2020/0221540 A1* | 7/2020 | Sun | H04W 8/08 |

OTHER PUBLICATIONS

Author Unknown, "Technical Specification Group Services and System Aspects; System Architechture for the 5G System; Stage 2 (Release 15)," 3GPP TS 23.501, Version 15.0.0, Dec. 2017, 3GPP Organizational Partners, 181 pages.
Author Unknown, "Technical Specification Group Services and System Aspects; Procedures for the 5G System Stage 2 (Release 15)," 3GPP TS 23.502, Version 1.4.0, Dec. 2017, 3GPP Organizational Partners, 260 pages.
Catt, "S2-174578: TS 23.502: Inserting Intermediate SMF during registration procedure," SA WG2 Meeting #122, Jun. 26-30, 2017, San Jose Del Cabo, Mexico, 4 pages.
Ericsson, "S2-173006: 23.501: SMF Service Areas," SA WG2 Meeting #121, May 15-19, 2017, Hangzhou, China, 3GPP, 13 pages.
Ericsson, "S2-174193: SMF Service Areas," SA WG2 Meeting #122, Jun. 26-30, 2017, San Jose Del Cabo, Mexico, 17 pages.
SA WG2, "TD SP-170743: New SID on Enhancing Topology of SMF and UPF in 5G Networks," SA WG2 Meeting #122 3GPP TSG SA Meeting #77, Sep. 13-15, 2017, Sapporo, Japan, 3 pages.
International Search Report and Written Opinion for International Patent Application No. PCT/EP2018/050337, dated Nov. 15, 2018, 11 pages.
Huawei, et al., "S2-174326: TS 23.501: Additional SMF Selection and the architecture," 3GPP TSG SA WG2 Meeting #121, Jun. 26-30, 2017, 8 pages.
Huawei, et al., "S2-178016: Resolve issue in PDU session establishment when PDU session authentication is used," 3GPP SA WG2 Meeting #123, Oct. 23-27, 2017, Ljubljana, Slovenia, 14 pages.
First Office Action for Chinese Patent Application No. 201880085627.8, dated Nov. 16, 2021, 9 pages.
Examination Report for Indian Patent Application No. 202047033304, dated Nov. 26, 2021, 6 pages.

* cited by examiner (a)

(b)

METHODS AND APPARATUSES FOR SELECTING A SESSION MANAGEMENT ENTITY FOR SERVING A WIRELESS COMMUNICATION DEVICE

This application is a 35 U.S.C. § 371 national phase filing of International Application No. PCT/EP2018/050337, filed Jan. 8, 2018, the disclosure of which is incorporated herein by reference in its entirety.

TECHNICAL FIELD

The present disclosure relates to methods and function entities for using multiple session management entities in a core network of a wireless communication system for serving a wireless communication device in the wireless communication system.

BACKGROUND

The Third Generation Partnership Project (3GPP) has discussed possible scenarios regarding how User Plane Function (UPF) service area and Session Management Function (SMF) service area can be deployed in operator's network. However, in release 15 of the 3GPP specifications it is assumed that SMF service area covers the entire operator network. Multiple SMFs are only allowed for home routed PDU session where one visited SMF (V-SMF) in the visited Public Land Mobile Network (VPLMN) and one home SMF (H-SMF) in the home PLMN (HPLMN).

The possible deployments where an SMF only controls a part of the network has not yet been studied.

Thus, there is yet no solution in 3GPP for cases where the SMF cannot control all the UPFs in the PLMN or similar. This is a valid case, e.g. in case of a large size operator where distributed packet core exist in different regions and mobility among different regions are expected.

SUMMARY

In view of the background above there is a need for an "area" based SMF/UPF deployment within the operator's network (e.g. within the PLMN) instead of a network based SMF deployment (i.e. a PLMN based deployment).

One embodiment accomplishes at least a part of this by being directed to a method of selecting a session management (SM) entity for serving a wireless communication device (WCD) in a core network that comprises an access management entity serving the WCD and an anchor SM entity that controls a first user plane entity that handles a data session associated with the WCD in a first domain, and a second SM entity for controlling a second user plane entity in a second domain of the core network. The method is performed by the access management entity and comprises:
  selecting—based on WCD information indicating properties of the WCD and based on SM domain information at least indicating the user plane entities that are controlled by the first SM entity and the second SM entity respectively—the second SM entity as an additional intermediate SM entity to control a user plane entity in the second domain for handling the data session in the second domain;
  sending, towards the second SM entity, a session request message requesting the second SM entity to act as the additional intermediate SM by allocating resources for handling the data session in the second domain;
  receiving, in response to the session request message, a session response message indicating that the second SM entity has accepted to act as the additional intermediate SM entity.

Another embodiment accomplishes at least a part of this by being directed to a method of selecting a SM entity for serving a WCD in a core network that comprises an access management entity serving the WCD and an anchor SM entity that controls a first user plane entity that handles a data session associated with the WCD in a first domain, and a second SM entity for controlling a second user plane entity in a second domain of the core network; the method is performed by the anchor SM entity and comprises:
  receiving a session request message sent by the access management entity, which message indicates that an additional intermediate SM entity is needed to control a user plane entity in the second domain for handling the data session in the second domain;
  selecting—based on WCD information indicating properties of the WCD and based on SM domain information at least indicating the user plane entities that are controlled by the first SM entity and the second SM entity respectively—the second SM entity as the additional intermediate SM entity to control a user plane entity in the second domain for handling the data session in the second domain;
sending, towards the access management entity, a session response message indicating that the second SM entity shall be requested to act as the additional intermediate SM by allocating resources for handling the data session in the second domain.

Another embodiment accomplishes at least a part of this by being directed to a method of selecting a SM entity for serving a WCD in a core network that comprises an access management entity serving the WCD and an anchor SM entity that controls a first user plane entity that handles a data session associated with the WCD in a first domain, and a second SM entity for controlling a second user plane entity in a second domain of the core network.

The method is performed by the anchor SM entity and comprises:
  receiving a session request message sent by the access management entity, which message indicates that an additional intermediate SM entity is needed to control a user plane entity in the second domain for handling the data session in the second domain;
  selecting—based on WCD information indicating properties of the WCD and based on SM domain information at least indicating the user plane entities that are controlled by the first SM entity and the second SM entity respectively—the second SM entity as the additional intermediate SM entity to control a user plane entity in the second domain for handling the data session in the second domain;
  sending, towards the second SM entity, a session request message requesting the second SM entity to act as the additional intermediate SM by allocating resources for handling the data session in the second domain;
  receiving, in response to the session request message, a session response message indicating that the second SM entity has accepted to act as the intermediate SM entity.

Another embodiment accomplishes at least a part of this by being directed to an Access Management (AM) entity configured to operatively select a SM entity for serving a WCD in a core network that comprises the AM entity for serving the WCD, and the anchor SM entity to control a first user plane entity for handling a data session associated with the WCD in a first domain, and a second SM entity to control a second user plane entity in a second domain of the core network.

The AM entity comprises at least one processor and memory comprising instructions executable by the at least one processor whereby the AM entity is operable to:
  select—based on WCD information indicating properties of the WCD and based on SM domain information at least indicating the user plane entities that are controlled by the first SM entity and the second SM entity respectively—the second SM entity as an additional intermediate SM entity to control a user plane entity in the second domain for handling the data session in the second domain;
  send, towards the second SM entity, a session request message requesting the second SM entity to act as the additional intermediate SM by allocating resources for handling the data session in the second domain;
  receive, in response to the session request message, a session response message indicating that the second SM entity has accepted to act as the additional intermediate SM entity.

Another embodiment accomplishes at least a part of this by being directed to an anchor Session Management, (A-SM) entity configured to operatively select a SM entity for serving a WCD in a core network that comprises an access management entity for serving the WCD, and the anchor SM entity to control a first user plane entity for handling a data session associated with the WCD in a first domain, and a second SM entity to control a second user plane entity in a second domain of the core network.

The A-SM entity comprises at least one processor and memory comprising instructions executable by the at least one processor whereby the AM entity is operable to:
  receive a session request message sent by the access management entity, which message indicates that an additional intermediate SM entity is needed to control a user plane entity in the second domain for handling the data session in the second domain;
  select—based on WCD information indicating properties of the WCD and based on SM domain information at least indicating the user plane entities that are controlled by the first SM entity and the second SM entity respectively—the second SM entity as the additional intermediate SM entity to control a user plane entity in the second domain for handling the data session in the second domain;
  send, towards the access management entity, a session response message indicating that the second SM entity shall be requested to act as the additional intermediate SM by allocating resources for handling the data session in the second domain.

Another embodiment accomplishes at least a part of this by being directed to an anchor SM (A-SM) entity configured to operatively select a SM entity for serving a WCD in a core network that comprises an access management entity for serving the WCD, and the anchor SM entity to control a first user plane entity to handle a data session associated with the WCD in a first domain, and a second SM entity to control a second user plane entity in a second domain of the core network The A-SM entity comprises at least one processor and memory comprising instructions executable by the at least one processor whereby the AM entity is operable to:
  receive a session request message sent by the access management entity, which message indicates that an additional intermediate SM entity is needed to control a user plane entity in the second domain for handling the data session in the second domain;
  select—based on WCD information indicating properties of the WCD and based on SM domain information at least indicating the user plane entities that are controlled by the first SM entity and the second SM entity respectively—the second SM entity as the additional intermediate SM entity to control a user plane entity in the second domain for handling the data session in the second domain;
  send, towards the second SM entity, a session request message requesting the second SM entity to act as the additional intermediate SM and allocate resources for handling the data session in the second domain;
  receive, in response to the session request message, a session response message indicating that the second SM entity has accepted to act as the intermediate SM entity.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments.

Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Figure 1:
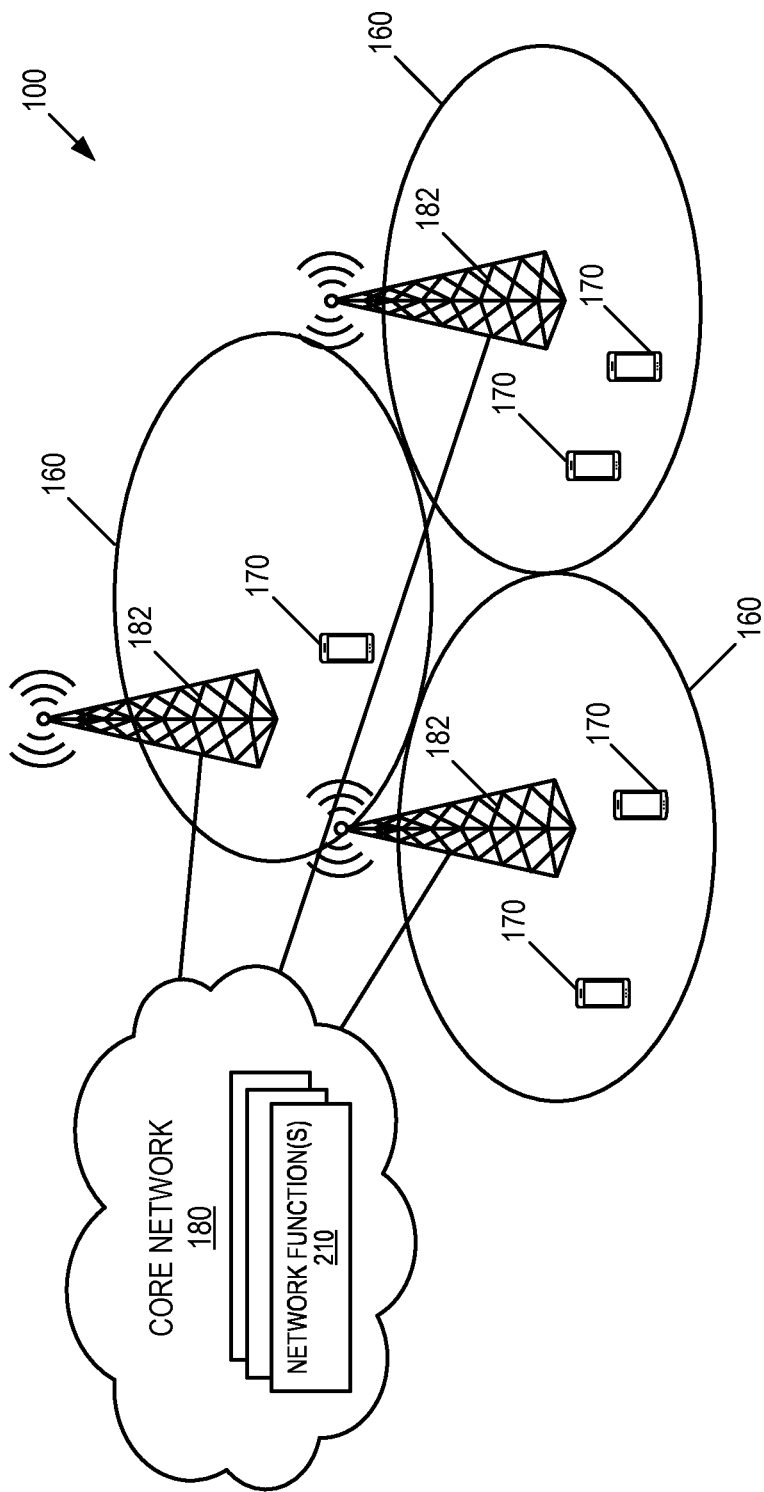
FIG. 1 illustrates an exemplary wireless communication system in which some embodiments of the present disclosure can be implemented.

FIG. 1 illustrates one example of a wireless communication system 100 in which embodiments of the present disclosure may be implemented. The wireless communication system 100 may be a cellular communications system such as, for example, based on a fifth generation (5G) New Radio (NR) network or an Long Term Evolution (LTE) cellular communications system. As illustrated, in this example, the wireless communication system 100 includes a plurality of radio access nodes 182 (e.g., evolved Node B (eNB) or 5G base stations which are referred to as gNBs, or other base stations or similar). Also, the wireless communication system 100 includes a plurality of wireless communication devices (WCD) 170 (e.g., conventional User Equipment (UE), Machine Type Communication (MTC) UEs/Machine-to-Machine (M2M) UEs). The term "UE" may be, by way of example and not limitation, a User Equipment (UE), a SS (Subscriber Station), a Portable Subscriber Station (PSS), a Mobile Station (MS), a Mobile Terminal (MT) or an Access Terminal (AT). The UE may include, but not limited to, mobile phones, cellular phones, smart phones, or personal digital assistants (PDAs), portable computers, image capture terminal devices such as digital cameras, gaming terminal devices, music storage and playback appliances, wearable terminal devices, vehicle-mounted wireless terminal devices and the like. In the following description, the terms "UE", "terminal device", "mobile terminal" and "user equipment" may be used interchangeably. The wireless communication system 100 is organized into cells 160, which are connected to a core network 180 via the corresponding radio access nodes 182. The radio access nodes 182 are typically constituting a Radio Access Network (RAN) and are capable of communicating with the wireless communication devices 170 along with any additional elements suitable to support communication between wireless communication devices or between a wireless communication device and another communication device (such as a landline telephone). The core network 180 includes one or more network node(s) or function(s) 210. In some embodiments, the network functions/entities 210 may comprise, for example, any of the network functions shown in FIGS. 2-3.

Figure 2:
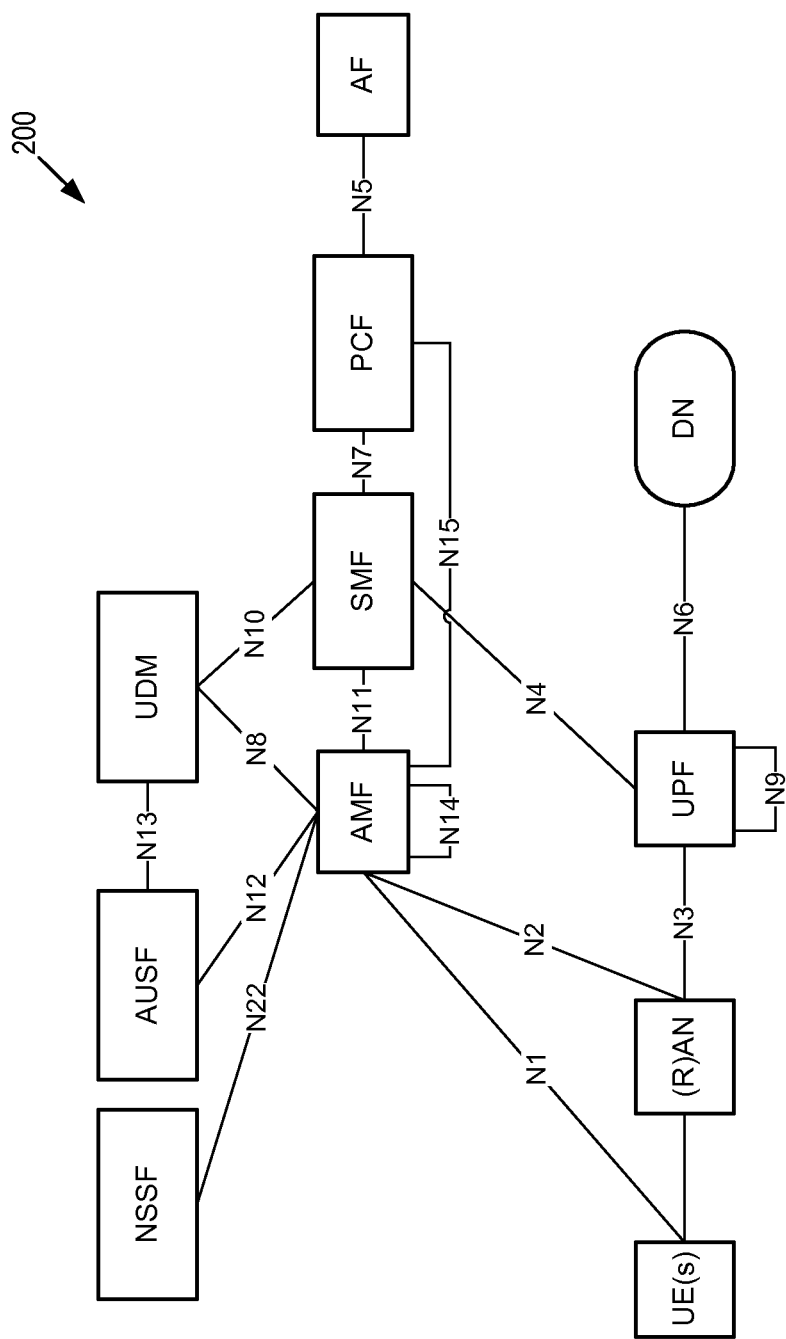
FIG. 2 illustrates a 5G network architecture using point-to-point reference points/interfaces, in which architecture some embodiments of the present disclosure can be implemented.

FIG. 2 illustrates a wireless communication system 200 represented as a 5G network architecture composed of core Network Functions (NFs), where interaction between any two NFs is represented by a point-to-point reference point/interface.

Seen from the radio access side the 5G network architecture shown in FIG. 2 comprises a plurality of User Equipment (UEs) connected to either a Radio Access Network (RAN) or an Access Network (AN) as well as an Access and Mobility Management Function (AMF). Typically, the R(AN) comprises base stations, e.g. such as evolved Node Bs (eNBs) or 5G base stations (gNBs) or similar. Seen from the core network side, the 5G core NFs shown in FIG. 2 include a Network Slice Selection Function (NSSF), an Authentication Server Function (AUSF), a Unified Data Management (UDM), an Access and Mobility Management Function (AMF), a Session Management Function (SMF), a Policy Control Function (PCF), and a User Plane Function (UPF). The Application Function (AF) may be seen as a function that communicates with NFs of the core network but that is somewhat outside the specification defining the actual core network. Rather, the AF is seen as trusted or untrusted by the core network.

Reference point representation in the 5G network architecture is used to develop detailed call flows in the normative standardization. The N1 reference point is defined to carry signaling between UE and AMF. The reference points for connecting between AN and AMF and between AN and UPF are defined as N2 and N3, respectively. There is a reference point, N11, between AMF and SMF, which implies that SMF is at least partly controlled by AMF. N4 is used by SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since PCF applies policy to AMF and SMP, respectively. N12 is required for the AMF to perform authentication of the UE. N8 and N10 are defined because the subscription data of UE is required for AMF and SMF.

The 5G core network aims at separating user plane and control plane. The user plane carries user traffic while the control plane carries signaling in the network. In FIG. 2, the UPF is in the user plane and all other NFs, i.e., AMF, SMF, PCF, AF, NSSF, AUSF, and UDM, are in the control plane. Separating the user plane from the control plane guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like PCF and AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
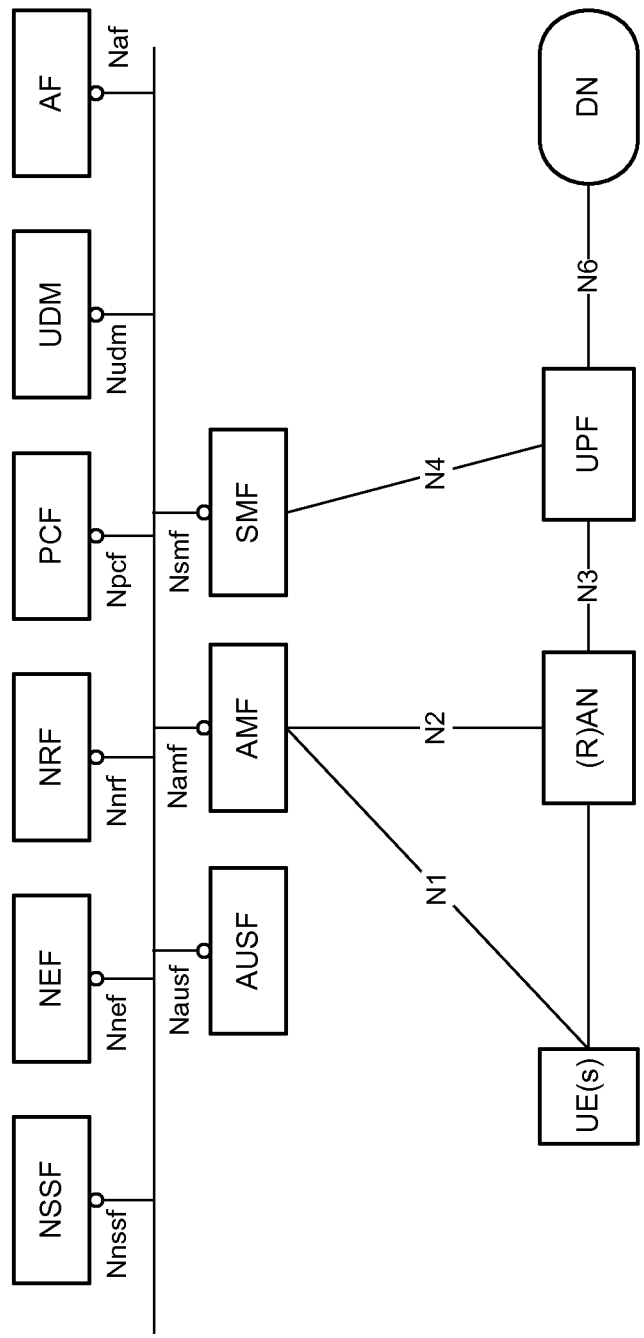
FIG. 3 illustrates a 5G network architecture using service-based interfaces, in which architecture some embodiments of the present disclosure can be implemented.

FIG. 3 illustrates a 5G network architecture using service-based interfaces between the NFs in the control plane, instead of the point-to-point reference points/interfaces used in the 5G network architecture of FIG. 2. The NFs described above with reference to FIG. 2 correspond to the NFs shown in FIG. 3. The service(s) etc. that a NF provides to other authorized NFs can be exposed to the authorized NFs through the service-based interface. In FIG. 3 the service-based interfaces are indicated by the letter "N" followed by the name of the NF, e.g. Namf for the service-based interface of the AMF and Nsmf for the service-based interface of the SMF etc. The Network Exposure Function (NEF) and the Network Repository Function (NRF) in FIG. 3 are not shown in FIG. 2 discussed above. However, it should be clarified that all NFs depicted in FIG. 2 can interact with the NEF and the NRF of FIG. 3 as necessary, though not explicitly indicated in FIG. 2.

Some properties of the NFs shown in FIGS. 2-3 may be described in the following manner. The AMF provides UEbased authentication, authorization, mobility management, etc. A UE even using multiple access technologies is basically connected to a single AMF because the AMF is independent of the access technologies used by the UE. The SMF is responsible for session management and allocates IP addresses to UEs. It also selects and controls the UPF for data transfer. If a UE has multiple data sessions, different SMFs may be allocated to each data session to manage them individually and possibly provide different functionalities per session. The AF provides information on the packet flow to PCF responsible for policy control in order to support Quality of Service (QoS). Based on the information, PCF determines policies about mobility and session management to make AMF and SMF operate properly. The AUSF supports authentication function for UEs or similar and thus stores data for authentication of UEs or similar while UDM stores subscription data of UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

The Access and Mobility Management Function (AMF) shown in FIGS. 2-3 is an example of an Access Management entity discussed herein. The access management entity is preferably configured to operatively manage the mobility of an UE or similar and to manage access authentication and authorization for an UE or similar. In particular, the access management entity is configured to operatively select a Session Management entity, e.g. such as a SMF or similar. Embodiments of the access management entity are configured to operatively select a in intermediate session management entity, e.g. such as a intermediate SMF (I-SMF) or similar.

The Session Management Function (SMF) shown in FIGS. 2-3 is an example of a Session Management entity discussed herein. The session management entity is preferably configured to operatively allocate IP addresses to an UE or similar and to perform session management for data sessions associated with the UE or similar. In particular, the session management entity is configured to operatively select and control an UPF or similar for handling data sessions associated with a UE, e.g. such as Packet Data Unit (PDU) sessions and similar. Embodiments of the session management entity are configured to operatively select a in intermediate session management entity, e.g. such as a intermediate SMF (I-SMF) or similar.

Figure 4:
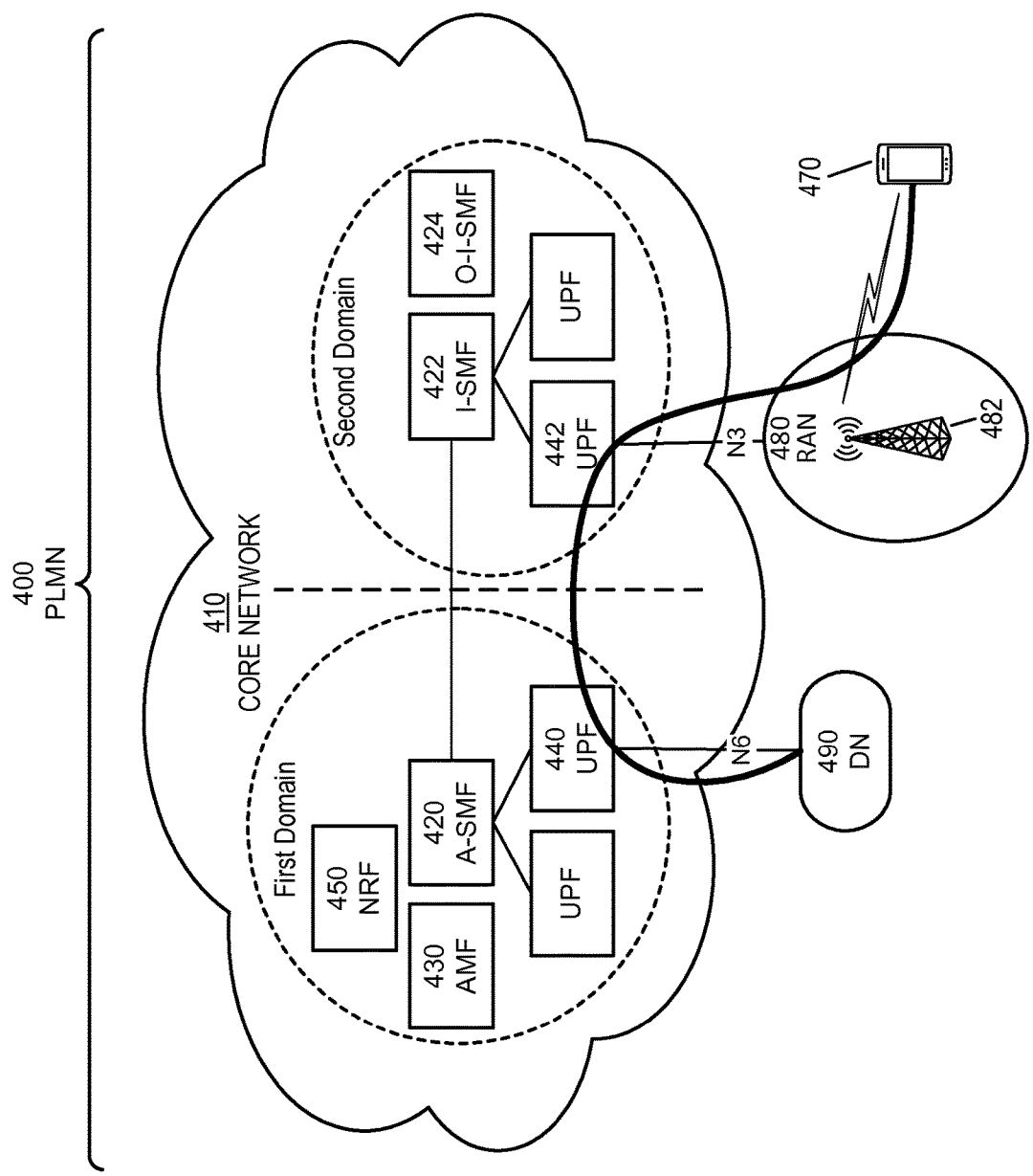
FIG. 4 shows a schematically illustration of a single PLMN 400 wherein embodiments of the present disclosure may be implemented.

FIG. 4 shows a schematically illustration of a single PLMN 400 wherein embodiments of the present disclosure may be implemented. The PLMN 400 comprises or is associated with an exemplifying core network 410 and an exemplifying Radio Access Network (RAN) 460. The core network 410 is an example of the core network 180 shown in FIG. 1. The RAN 480 comprises a radio base station 482 or similar serving a wireless communication device (WCD) 440. The radio base station 482 is an example of the radio access nodes 182 shown in FIG. 1. Typically, the RAN 480 comprises a plurality of radio base stations or similar, but for clarity reasons only one base station is shown. The WCD 470 is an example of the WCD 170 shown in FIG. 1 and may thus be a e.g. a conventional User Equipment (UE), a Machine Type Communication (MTC) UE or a Machine-to-Machine (M2M) UEs or similar etc.

The exemplifying core network 410 comprises a Network Repository Entity 450 (e.g. a NRF), an Access Management Entity 430 (e.g. an AMF), an anchor session management entity 420 (e.g. an anchor SMF, A-SMF), an intermediate session management entity 422 (e.g. an intermediate SMF, I-SMF), a first user plane entity 440 (e.g. an UPF), a second user plane entity 442 (e.g. an UPF).

The expression Session management is generally abbreviated SM below. A Session Management Function is an example of a Session Management and is generally abbreviated SMF below.

As indicated by the thick curved line between the WCD 470 and an external Data Network (DN) 470 in FIG. 4, it is assumed that the WCD 470 has established a data session (e.g. a PDU session) for communicating user plane data with the DN 490 via the RAN 480 and the first user plane entity 440 and the second user plane entity 442, thus using multiple user plane entities. The DN 490 may e.g. correspond to the Internet or similar.

It is further assumed that the anchor SM entity 420 (hereafter denoted A-SMF entity) only controls user plane entities in a first domain including the first user plane entity 440 (hereafter denoted first UPF entity), and that the intermediate SM entity 422 (hereafter denoted I-SMF entity) only controls user plane entities in a second domain including the second user plane entity 442 (hereafter denoted second UPF entity). Thus, the anchor A-SMF entity 420 controls the first UPF entity 440 for handling the data session for the WCD 470 in the first domain, and the intermediate I-SMF entity 422 controls the second UPF entity 442 for handling the data session for the WCD 470 in the second domain. Thus, multiple UPF entities are used for the data session.

Preferably, the A-SMF entity is the SMF entity (c.f. A-SMF entity 440 in FIG. 4) that controls the anchor UPF entity (c.f. UPF 440 in FIG. 4) that handles the data session for the WCD 470, i.e. the UPF entity with the interface towards the DN (c.f. DN 490 in FIG. 4), e.g. the N6 interface. Preferably, the A-SMF entity also has the interfaces towards PCC and UDM.

Preferably, the I-SMF entity is the SMF entity (c.f. I-SMF entity 422 in FIG. 4) that controls the intermediate UPF entity (c.f. UPF 442 in FIG. 4) that is closer to the RAN (c.f. RAN 480 in FIG. 4) serving the WCD 470, i.e. the UPF entity that has the interface towards the RAN, e.g. the N3 interface. This is an intermediate UPF entity in the path between RAN and the anchor UPF entity for the data session.

The first domain and the second domain that are indicated in FIG. 4 may be different administrative areas or similar of the PLMN 400, or e.g. different parts of the core network 410 associated with the PLMN 400.

For example, the PLMN 400 may be divided into separate administrative areas such that an anchor A-SMF entity in a first administrative area (first domain) cannot control any UPF entity in a second administrative area (second domain). Thus, the A-SMF entity cannot control any UPF entities for handling a PDU session associated with a WCD (e.g. an UE) when the WCD is located in the second administrative area. According to embodiments herein, an additional intermediate I-SMF entity is therefore setup in the second administrative area for controlling an UPF entity to handle the PDU session for the WCD when it is located in the second administrative area.

In another example, the core network 410 may comprise an enterprise network (first domain) and a general network (second domain) such that an anchor A-SMF in the enterprise network cannot control any UPF entity in the general network. Thus, the A-SMF entity cannot control any UPF entities for handling a PDU session associated with a WCD (e.g. an UE) when the WCD is located in the general network. where the UE is currently located. According to embodiments herein, an additional intermediate I-SMF entity is therefore setup in the general network for controlling an UPF entity to handle the PDU session for the WCD when it is located in the general network. In this example, the core network 410 may be associated with the PLMN 400, but it may also be that only the general network (first domain) is associated with the PLMN 400.

For example, the core network 410 may have an hierarchal structure and thus comprise a central network (first domain) and a local network (second domain) such that an anchor A-SMF entity cannot control any UPF entities for handling a PDU session associated with a WCD (e.g. an UE) when the WCD is located in the local network. A hierarchal structure may e.g. be used in connection with edge computing and/or local break out. According to embodiments herein, an additional intermediate I-SMF entity is therefore setup in the local network for controlling an UPF entity to handle the PDU session for the WCD when it is located in the local network.

Figure 5:
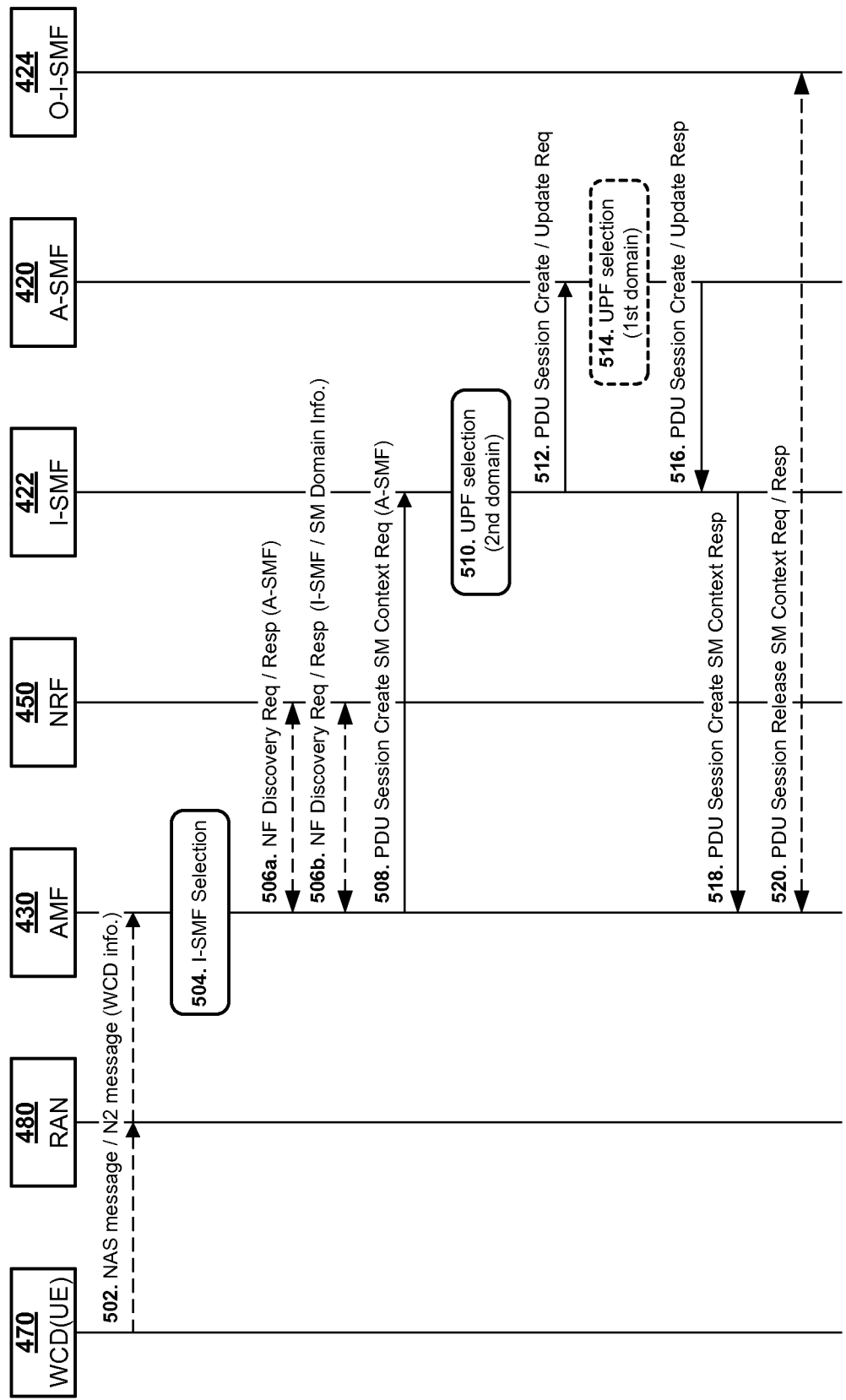
FIGS. 5-7 show signalling diagrams illustrating exemplifying methods for selecting an intermediate SM entity (I-SMF)

FIG. 5 shows a signalling diagram illustrating an exemplifying method for selecting an intermediate SM entity (I-SMF).

In this example an access management entity such as the AMF entity 430 decides if multiple SM entities—i.e. both an anchor SM entity (e.g. A-SMF 420) and an intermediate SM entity (e.g. I-SMF 422)—are needed for a data session, e.g. such as a PDU session. Preferably, the decision is done based on local configuration or with support from a NRF entity 450 or similar. In addition, it is also preferred that the AMF entity 430 is responsible for adding and removing the intermediate SM entity. It is preferred that the AMF entity 430 knows both the A-SMF and the I-SMF. However, the AMF entity may only communicate with the I-SMF if one is operatively selected. The session management domains (SM domains) is directly (if I-SMF selection is based on AMF local configuration) or indirectly (if -SMF selection is based on NRF) known/realized by the AMF entity.

Generally, a Session Management domain (SM domain) indicates the UPF entities that are controlled by an individual SM entity. In FIG. 4 the SM domain for the A-SMF entity 420 has been denoted "first domain" and the SM domain for the I-SMF entity 422 has been denoted "second domain". A SM domain may e.g. correspond to a SMF service area or a SMF service area topology. Herein, the SM domain information indicates UPF entities that are controlled by the individual SM entities respectively.

The exemplifying method illustrated in FIG. 5 will be further described below with reference to both FIGS. 4 and 5. It is assumed that the core network 410 comprises an AMF entity 430 serving a UE 470, and an anchor A-SMF entity 420 that controls a first UPF entity 440 that handles the PDU session associated with the UE 470 in a first domain. It is further assumed that the core network 410 comprises an intermediate I-SMF entity 422 for controlling a second UPF entity 442 in a second domain of the core network 410. The A-SMF entity 420 cannot control any UPF in the second domain.

The method is performed in the AMF entity 430 and comprises:

Action 502. The AMF entity 430 may receive an initial message that comprises WCD information indicating properties of the WCD 470, exemplified by a UE in FIGS. 4 and 5. Preferably, the received message originates from the UE 470. The received message may e.g. be a UE NAS message and/or a RAN N2 message.

Generally, the WCD information may e.g. indicate the identity of the UE 470, e.g. information associated with the UE 470 such as information indicating an International Mobile Subscriber Identity (IMSI) or similar, a Temporary Mobile Subscriber Identity (TMSI) or similar, or a Globally Unique Temporary UE Identity (GUTI) or similar associated with the UE 470.

Generally, the WCD information may e.g. indicate the location of the UE 470, e.g. indicate the physical area (e.g. the geographical area) or logical area in which the UE 470 is served, e.g. such as the RAN or part of a RAN currently serving the UE (e.g. indicated by a cell identity or a Routing Area or a Tracking Area or similar). For example, the location information may indicate the domain or similar in which the UE is currently served (e.g. indicate whether the UE 470 is served in the first domain or the second domain as described above).

Action 504. The AMF entity 430 selects the I-SMF entity 422 as an additional intermediate SM entity to control a second user plane entity in the second domain for handling the data session in the second domain. Preferably, the selection is based on WCD information indicating properties of the WCD 470 and on SM domain information at least indicating the user plane entities that are controlled by the A-SMF entity 420 and the I-SMF entity 422 respectively, The selection may at least partly be based on local configuration in the AMF entity 430. Then it is preferred that the AMF entity 430 comprises information about the SM domains (e.g. SMF service area or SMF service area topology) indicating the UPF entities that are controlled by the individual SM entities. Also, in case of local configuration, the AMF entity 430 may comprise the WCD information. However, it may alternatively be received in action 502 above.

For example, in FIG. 4 the UE 470 is served by the RAN 480 but the A-SMF entity 420 only controls UPF entities in the first domain that has or can establish an interface (e.g. an N6 interface) to the DN 490, but the A-SMF 420 controls no UPF entities in the second domain comprising the UPF entities that has or can establish an interface (e.g. an N3 interface) to the RAN 480 currently serving the UE 470. In this scenario, it is preferred that the AMF entity 430 selects the I-SMF entity 422 as an additionally intermediate SM entity to control the UPF entity 422 in the second domain for handling the PDU session in that domain.

In addition or alternatively, the selection may be done with support of the NRF entity 450, e.g. according to optional actions 506a and 506b or at least optional action 506b described below.

Action 506a. The AMF entity 430 may optionally use the NRF entity 430 to discover/select the A-SMF entity 430, if it's not locally configured in the AMF entity 430. Typically, A-SMF entity selection is only needed in case of the establishment of a new PDU session for the UE 470. This may e.g. be done by sending a NF Discovery Request message to the NRF entity 450 requesting an A-SMF entity for the PDU session. It is referred that the NRF entity 450 then sends an NF Discovery Response message indicating the A-SMF entity 420 to be received by the AMF entity 430.

Action 506b. The AMF entity 430 may optionally use the NRF to select the I-SMF entity. This may e.g. be done by sending a request message, e.g. a Discovery Request message, to the NRF entity 450 requesting at least one of: the SM domain information; or an intermediate I-SMF entity to control an UPF entity for handling the PDU session in the second domain. The request message may e.g. comprise WCD information, e.g. indicating the location of the WCD 470.

It is preferred that the NRF entity 450 then sends a response message, e.g. a Discovery Response message, to be received by the AMF entity 430, which response message comprises information indicating at least one of: the SM domain information; or a selected intermediate I-SMF entity 422.

Preferably, an such exchange of a request and a response message is done before or at least in connection with the selection in action 504.

Action 508. When the AMF entity 430 has selected the I-SMF entity 422 as the intermediate SM entity in the second domain then the AMF entity 430 sends a request message towards the selected intermediate I-SMF entity 422, which message indicates that the I-SMF entity 422 shall act as the additional I-SMF entity and that it shall allocate resources for handling the PDU session in the second domain. Indeed, already that the I-SMF entity 422 is requested to allocate such resources may indicate that the I-SMF entity 422 it is requested to act as an intermediate SM entity.

Preferably, the request message comprises information indicating the identity of the AMF entity 430. The request message may e.g. be a session request message, e.g. a PDU Session Create SM Context request message.

The resources to be allocated by the I-SMF 422 may be an allocation/selection of an UPF entity for handling the PDU session in the second domain. Alternatively or additionally, the resources to be allocated by the I-SMF 422 may e.g. be a data session context for handling the PDU session in the second domain. The data session context may e.g. be a SM context. The data session context may e.g. comprise information indicating the identity of the data session, e.g. the identity of the PDU session or similar.

Action 510. In response to receiving the request message from the AMF entity 430 in action 508, the selected intermediated I-SMF entity 422 selects a user plane entity in the second domain for handling the PDU session in the second domain.

For example, it is preferred that the intermediate SM entity I-SMF entity 422 in FIG. 4 selects the second UPF entity 442 for handling the PDU session in the second domain.

Action 512. When the intermediate I-SMF entity 422 has selected the user plane entity in the second domain for handling the PDU session in the second domain, then the I-SMF entity 422 sends a request message towards the anchor A-SMF entity 420 indicating that the I-SMF entity 422 now acts as the intermediate SM entity for the PDU session in the second domain.

The message may e.g. be a PDU Session Update Request message. Alternatively, the message may be a PDU Session Create Request Message, e.g. in case the PDU session is to be created also in the first domain.

Action 514. In response to request message received in action 512, the anchor A-SMF entity 420 may select a user plane entity in the first domain. However, this is only done in case the PDU session is to be created also in the first domain.

Action 516. In response to request message received in action 512, the anchor A-SMF entity 420 sends a response message towards the I-SMF entity 420.

The message may e.g. be a PDU Session Update Response message. Alternatively, the message may be a PDU Session Create Response Message, e.g. in case the PDU session is created also in the first domain, e.g. in case the PDU session did not already exist in the first domain.

Action 518. In response to receiving the request message in action 508, then the intermediate I-SMF entity 422 sends a response message towards the AMF entity 430. Preferably, the response message indicates that the I-SMF entity 422 accepts to act as the additional I-SMF entity and that it has allocate resources for handling the PDU session in the second domain. Indeed, already that the I-SMF entity 422 has allocated such resources indicates that the I-SMF entity 422 has accepted to act as an intermediate SM entity.

The response message may e.g. be a PDU Session Create SM Context response message.

Action 520. The AMF entity 430 releases resources in any old intermediate SM entity O-I-SMF 424 when there is one that has been previously selected.

Figure 6:
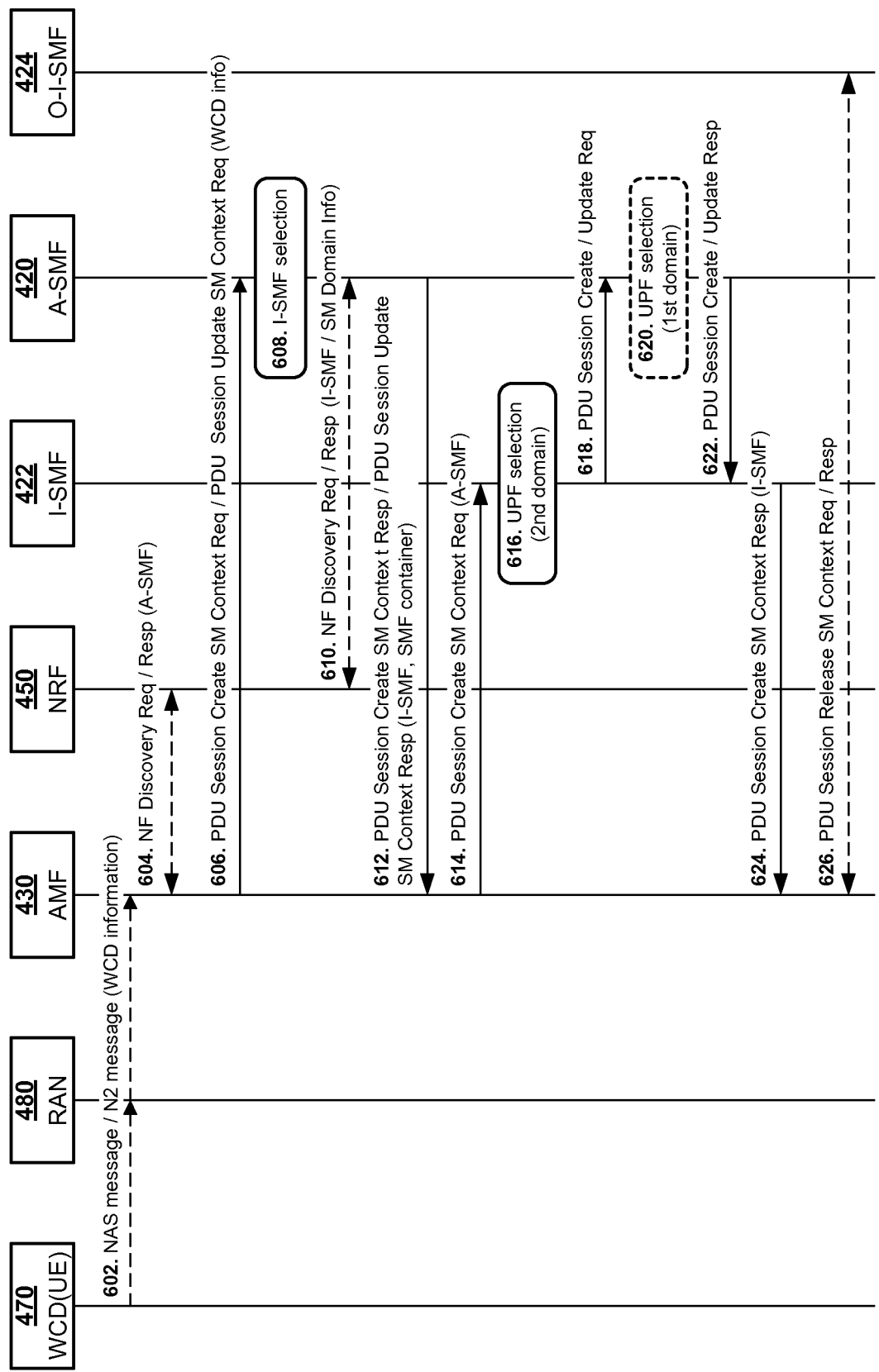

FIG. 6 shows a signalling diagram illustrating an exemplifying method for selecting an intermediate SM entity (I-SMF).

In this example an anchor SM entity such as the A-SMF entity 420 decides if multiple SM entities—i.e. both an anchor SM entity (e.g. A-SMF 420) and an intermediate SM entity (e.g. I-SMF 422)—are needed for a data session, e.g. such as a PDU session. Preferably, the decision is done based on local configuration or with support from a NRF entity 450 or similar. It is preferred that the AMF entity 430 knows both the A-SMF and the I-SMF. However, the AMF entity may only communicate with the I-SMF if one is operatively selected. The SM domains are typically not known by the AMF entity in this example.

The exemplifying method illustrated in FIG. 6 will be further described below with reference to both FIGS. 4 and 6. It is assumed that the core network 410 comprises an AMF entity 430 serving a UE 470, and an anchor A-SMF entity 420 that controls a first UPF entity 440 that handles a data session associated with the UE 470 in a first domain. It is further assumed that the core network 410 comprises an intermediate I-SMF entity 422 for controlling a second UPF entity 442 in a second domain of the core network 410. The A-SMF entity 420 cannot control any UPF in the second domain.

The method is performed in the anchor A-SMF entity 420 and comprises:

Action 602 and Action 604 in FIG. 6 corresponds to actions 502 and 506a described above with reference to FIG. 5.

Action 606. The A-SMF entity 420 receives a request message originating from the AMF entity 430. The request message indicates that a second SM entity shall act as an additional intermediate SM for handling the data session in the second domain. The request message may comprise WCD information that indicates properties of the UE 470, e.g. indicates the identity and/or the location of the UE 470. Additionally or alternatively, the WCD information may comprise information indicating properties associated with the data session in the first domain. The request message may e.g. be a session request message such as a PDU Session Create SM Context request message or a PDU Session Update SM Context request message.

Action 608. The A-SMF entity 420 selects the A-SMF entity 420 selects the I-SMF entity 422 as an additional intermediate SM entity to control a second user plane entity in the second domain for handling the data session in the second domain. Preferably, the selection is based on WCD information indicating properties of the WCD 470 and on SM domain information at least indicating the user plane entities that are controlled by the A-SMF entity 420 and the I-SMF entity 422 respectively, The selection may at least partly be based on local configuration in the A-SMF entity 420. Then it is preferred that the A-SMF entity 420 comprises information about the SM domains (e.g. SMF service areas or SMF service area topology) indicating the UPF entities that are controlled by the individual SM entities. Also, in case of local configuration, the A-SMF entity 420 may comprise the WCD information. However, it may alternatively be received in action 606 above.

For example, in FIG. 4 the UE 470 is served by the RAN 480 but the A-SMF entity 420 only controls UPF entities in the first domain that has or can establish an interface (e.g. an N6 interface) to the DN 490, but the A-SMF 420 controls no UPF entities in the second domain comprising the UPF entities that has or can establish an interface (e.g. an N3 interface) to the RAN 480 currently serving the UE 470. In this scenario, it is preferred that the A-SMF entity 420 selects the I-SMF entity 422 as an additionally intermediate SM entity to control the UPF entity 422 in the second domain for handling the PDU session in that domain.

In addition or alternatively, the selection may be done with support of the NRF entity 450, e.g. according to optional action 610 described below.

Action 610. The A-SMF entity 420 may optionally use the NRF to select the I-SMF entity. This may e.g. be done by sending a request message, e.g. a Discovery Request message to the NRF entity 450 requesting at least one of: the SM domain information; or an intermediate I-SMF entity to control an UPF entity for handling the PDU session in the second domain. The request message may e.g. comprise WCD information, e.g. indicating the location of the WCD 470.

It is preferred that the NRF entity 450 then sends a response message, e.g. a Discovery Response message, to be received by the -SMF entity 420, which response message comprises information indicating at least one of: the SM domain information; or a selected intermediate I-SMF entity 422.

Preferably, an such exchange of a request and a response message is done before or at least in connection with the selection in action 608.

Action 612. When the A-SMF entity 420 has selected the I-SMF entity 422 as the intermediate SM entity in the second domain then the A-SMF entity 420 sends a response message towards the AMF entity 430 to indicate that the I-SMF entity 422 has been selected as the as the intermediate SM entity to control a second user plane entity in the second domain for handling the data session in the second domain.

Preferably, the response message is sent as a response to the request message received in action 606. Preferably, the response message comprises information indicating the identity of the I-SMF entity 4422. The response message may e.g. be a PDU Session Create SM Context response message or a PDU Session Update SM Context response message.

Action 614. As a response to the message received by the AMF entity 430 in action 612, the AMF entity 430 sends a request message towards the selected intermediate I-SMF entity 422, which message indicates that the I-SMF entity 422 shall act as the additional I-SMF entity and that it shall allocate resources for handling the PDU session in the second domain. Indeed, already that the I-SMF entity 422 is requested to allocate such resources indicates that the I-SMF entity 422 it is requested to act as an intermediate SM entity.

Preferably, the request message comprises information indicating the identity of the anchor A-SMF entity 420. The request message may e.g. be a PDU Session Create SM Context request message. The resources to be allocated by the I-SMF entity 422 may be an allocation/selection of an UPF entity for handling the PDU session in the second domain. Alternatively or additionally, the resources to be allocated by the I-SMF 422 may e.g. be a data session context for handling the PDU session in the second domain. The data session context may e.g. be a SM context. The data session context may e.g. comprise information indicating the identity of the data session, e.g. the identity of the PDU session or similar.

Action 616. In response to receiving the request message from the AMF entity 430 in action 614, the selected intermediated I-SMF entity 422 selects a user plane entity in the second domain for handling the PDU session in the second domain.

For example, it is preferred that the intermediate SM entity I-SMF entity 422 in FIG. 4 selects the second UPF entity 442 for handling the PDU session in the second domain.

Action 618. When the intermediate I-SMF entity 422 has selected the user plane entity in the second domain for handling the PDU session in the second domain, then the I-SMF entity 422 sends a request message towards the anchor A-SMF entity 420 indicating that the I-SMF entity 422 now acts as the intermediate SM entity for the PDU session in the second domain.

The message may e.g. be a PDU Session Update Request message. Alternatively, the message may be a PDU Session Create Request Message, e.g. in case the PDU session is to be created also in the first domain.

Action 620. In response to request message received in action 618, the anchor A-SMF entity 420 may select a user plane entity in the first domain. However, this is only done in case the PDU session is to be created also in the first domain.

Action 622. In response to request message received in action 618, the anchor A-SMF entity 420 sends a response message towards the I-SMF entity 422.

The message may e.g. be a PDU Session Update Response message. Alternatively, the message may be a PDU Session Create Response Message, e.g. in case the PDU session is created also in the first domain, e.g. in case the PDU session did not already exist in the first domain.

Action 624. In response to receiving the request message in action 614, the intermediate I-SMF entity 422 sends a response message towards the AMF entity 430.

Preferably, the response message indicates that the I-SMF entity 422 accepts to act as the additional I-SMF entity and that it has allocate resources for handling the PDU session in the second domain. Indeed, already that the I-SMF entity 422 has allocated such resources indicates that the I-SMF entity 422 has accepted to act as an intermediate SM entity.

The response message may e.g. be a PDU Session Create SM Context response message.

Action 626. The AMF entity 430 releases resources in any old intermediate SM entity O-I-SMF 424 when there is one that has been previously selected.

Figure 7:
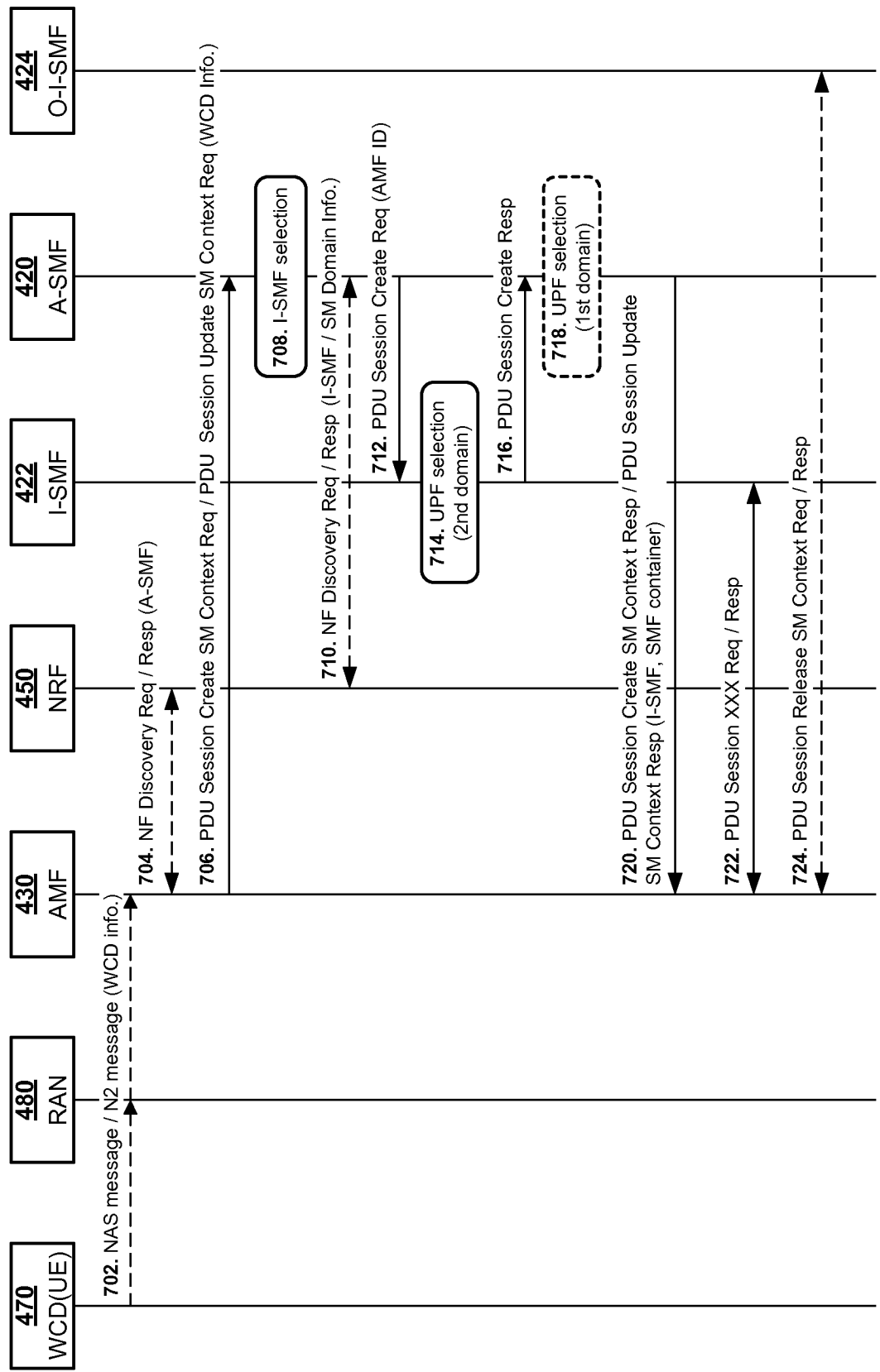

FIG. 7 shows a signalling diagram illustrating another exemplifying method for selecting an intermediate SM entity (I-SMF).

In this example an anchor SM entity such as the A-SMF entity 420 decides if multiple SM entities—i.e. both an anchor SM entity (e.g. A-SMF 420) and an intermediate SM entity (e.g. I-SMF 422)—are needed for a data session, e.g. such as a PDU session. Preferably, the decision is done based on local configuration or with support from a NRF entity 450 or similar. It is preferred that the AMF entity 430 only knows the SM entity that is responsible for handling the PDU session. The SM domains are typically not known by the AMF entity in this example.

The exemplifying method illustrated in FIG. 7 will be further described below with reference to both FIGS. 4 and 7. It is assumed that the core network 410 comprises an AMF entity 430 serving a UE 470, and an anchor A-SMF entity 420 that controls a first UPF entity 440 that handles a data session associated with the UE 470 in a first domain. It is further assumed that the core network 410 comprises an intermediate I-SMF entity 422 for controlling a second UPF entity 442 in a second domain of the core network 410. The A-SMF entity 420 cannot control any UPF in the second domain.

The method is performed in the anchor A-SMF entity 420 and comprises:

Action 702 and Action 704 in FIG. 7 corresponds to actions 502 and 506a described above with reference to FIG. 5.

Action 706. The A-SMF entity 420 receives a request message originating from the AMF entity 430. The request message indicates that a second SM entity shall act as an additional intermediate SM for handling the data session in the second domain. The request message may comprise WCD information that indicates properties of the UE 470, e.g. indicates the identity and/or the location of the UE 470. Additionally or alternatively, the WCD information may comprise information indicating properties associated with the data session in the first domain. The request message may e.g. be a session request message such as a PDU Session Create SM Context request message or a PDU Session Update SM Context request message.

Action 708. The A-SMF entity 420 selects the A-SMF entity 420 selects the I-SMF entity 422 as an additional intermediate SM entity to control a second user plane entity in the second domain for handling the data session in the second domain. Preferably, the selection is based on WCD information indicating properties of the WCD 470 and on SM domain information at least indicating the user plane entities that are controlled by the A-SMF entity 420 and the I-SMF entity 422 respectively, The selection may at least partly be based on local configuration in the A-SMF entity 420. Then it is preferred that the A-SMF entity 420 comprises information about the SM domains (e.g. SMF service areas or SMF service area topology) indicating the UPF entities that are controlled by the individual SM entities. Also, in case of local configuration, the AMF entity 430 may comprise the WCD information. However, it may alternatively be received in action 706 above.

For example, in FIG. 4 the UE 470 is served by the RAN 480 but the A-SMF entity 420 only controls UPF entities in the first domain that has or can establish an interface (e.g. an N6 interface) to the DN 490, but the A-SMF 420 controls no UPF entities in the second domain comprising the UPF entities that has or can establish an interface (e.g. an N3 interface) to the RAN 480 currently serving the UE 470. In this scenario, it is preferred that the A-SMF entity 420 selects the I-SMF entity 422 as an additionally intermediate SM entity to control the UPF entity 422 in the second domain for handling the PDU session in that domain.

In addition or alternatively, the selection may be done with support of the NRF entity 450, e.g. according to optional action 710 described below.

Action 710. The A-SMF entity 420 may optionally use the NRF to select the I-SMF entity. This may e.g. be done by sending a request message, e.g. a Discovery Request message to the NRF entity 450 requesting at least one of: the SM domain information; or an intermediate I-SMF entity to control an UPF entity for handling the PDU session in the second domain. The request message may e.g. comprise information indicating the location of the WCD 470.

It is preferred that the NRF entity 450 then sends a response message, e.g. a Discovery Response message, to be received by the -SMF entity 420, which response message comprises information indicating at least one of: the SM domain information; or a selected intermediate I-SMF entity 422.

Preferably, an such exchange of a request and a response message is done before or at least in connection with the selection in action 708.

Action 712. When the A-SMF entity 420 has selected the I-SMF entity 422 as the intermediate SM entity in the second domain then the A-SMF entity 430 sends a request message towards the selected intermediate I-SMF entity 422, which message indicates that the I-SMF entity 422 shall act as the additional I-SMF entity and that it shall allocate resources for handling the PDU session in the second domain. Indeed, already that the I-SMF entity 422 is requested to allocate such resources indicates that the I-SMF entity 422 it is requested to act as an intermediate SM entity.

Preferably, the request message comprises information indicating the identity of the AMF entity 430. The request message may e.g. be a session request message, e.g. such as a PDU Session Create Request message or even a PDU Session Create SM Context request message.

The resources to be allocated by the I-SMF 422 may be an allocation/selection of an UPF entity for handling the PDU session in the second domain. Alternatively or additionally, the resources to be allocated by the I-SMF 422 may e.g. be a data session context for handling the PDU session in the second domain. The data session context may e.g. be a SM context. The data session context may e.g. comprise information indicating the identity of the data session, e.g. the identity of a PDU session or similar.

Action 714. In response to receiving the request message from the A-SMF entity 420 in action 712, the selected intermediated I-SMF entity 422 selects a user plane entity in the second domain for handling the PDU session in the second domain.

For example, it is preferred that the intermediate SM entity I-SMF entity 422 in FIG. 4 selects the second UPF entity 442 for handling the PDU session in the second domain.

Action 716. In response to request message received in action 712, the I-SMF entity 422 sends a create response message towards the A-SMF entity 420, which response message indicates that the second SM entity 422 has allocated the resources and thus accepted to act as the intermediate SM entity.

The create response message may e.g. be a PDU Session Create response or even a PDU Session Create SM Context response message.

Action 718. The A-SMF entity 420 may select a user plane entity in the first domain. However, this is only done in case the PDU session is to be created also in the first domain.

Action 720. In response to receiving the request message in action 706, the A-SMF entity 420 sends a response message towards the AMF entity 430.

Preferably, the response message indicates that the I-SMF entity 422 accepts to act as the additional I-SMF entity and that it has allocate resources for handling the PDU session in the second domain. Indeed, already that the I-SMF entity 422 has allocated such resources indicates that the I-SMF entity 422 has accepted to act as an intermediate SM entity.

The response message may e.g. be a PDU Session Create SM Context response message or a PDU Session Update SM Context response message.

Action 724. The AMF entity 430 releases resources in any old intermediate SM entity O-I-SMF 424 when there is one that has been previously selected.

Figure 8:
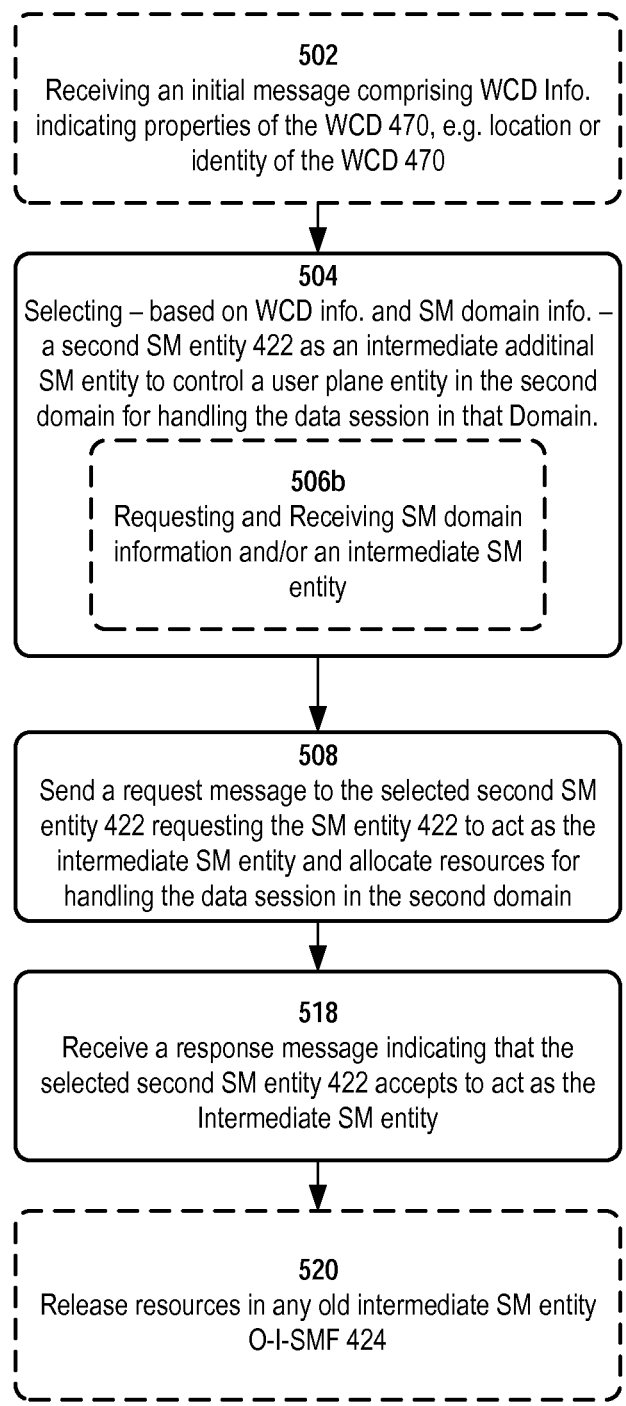
FIGS. 8-10 show flow charts illustrating exemplifying methods for selecting an intermediate SM entity (I-SMF)

FIG. 8 is a flowchart illustrating actions 502, 504 (possibly including action 506b), 508, 518 and 520 performed by an Access Management entity 430, e.g. in the form of an Access and Mobility Management Function (AMF). These actions correspond to the actions with the same reference number 502, 504, 506b, 508, 518 and 520 described above with reference to FIGS. 4 and 5.

Figure 9:
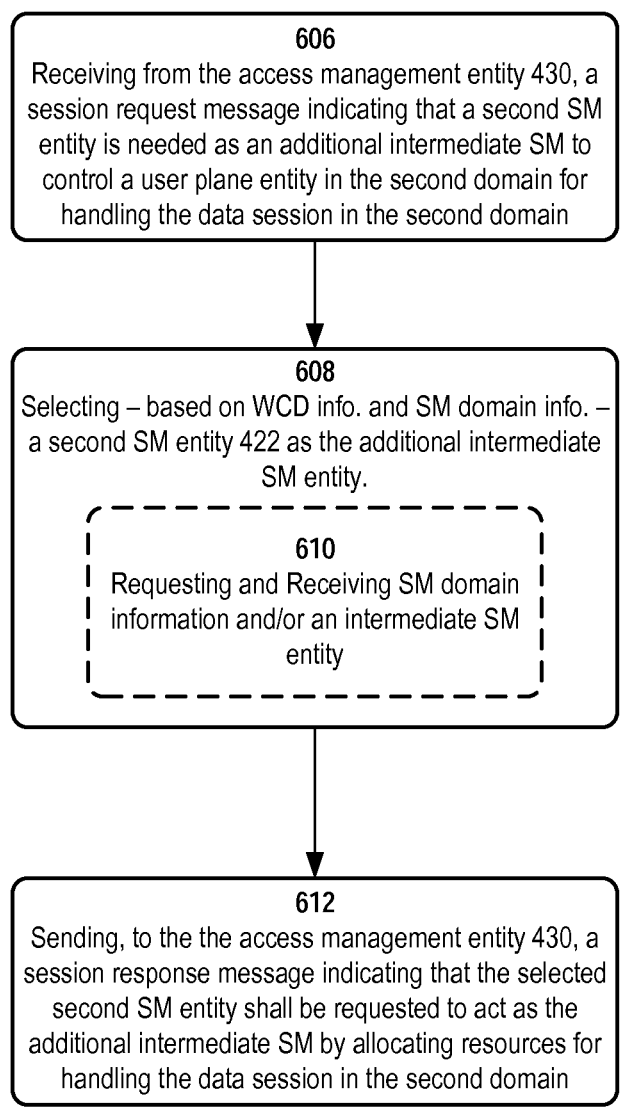

FIG. 9 is a flowchart illustrating actions 606, 608 (possibly including action 610) and 612 performed by an Anchor Session Management entity 430, e.g. in the form of an anchor Session Management Function (A-SMF). These actions correspond to the actions with the same reference number 606, 608, 610 and 612 described above with reference to FIGS. 4 and 6.

Figure 10:
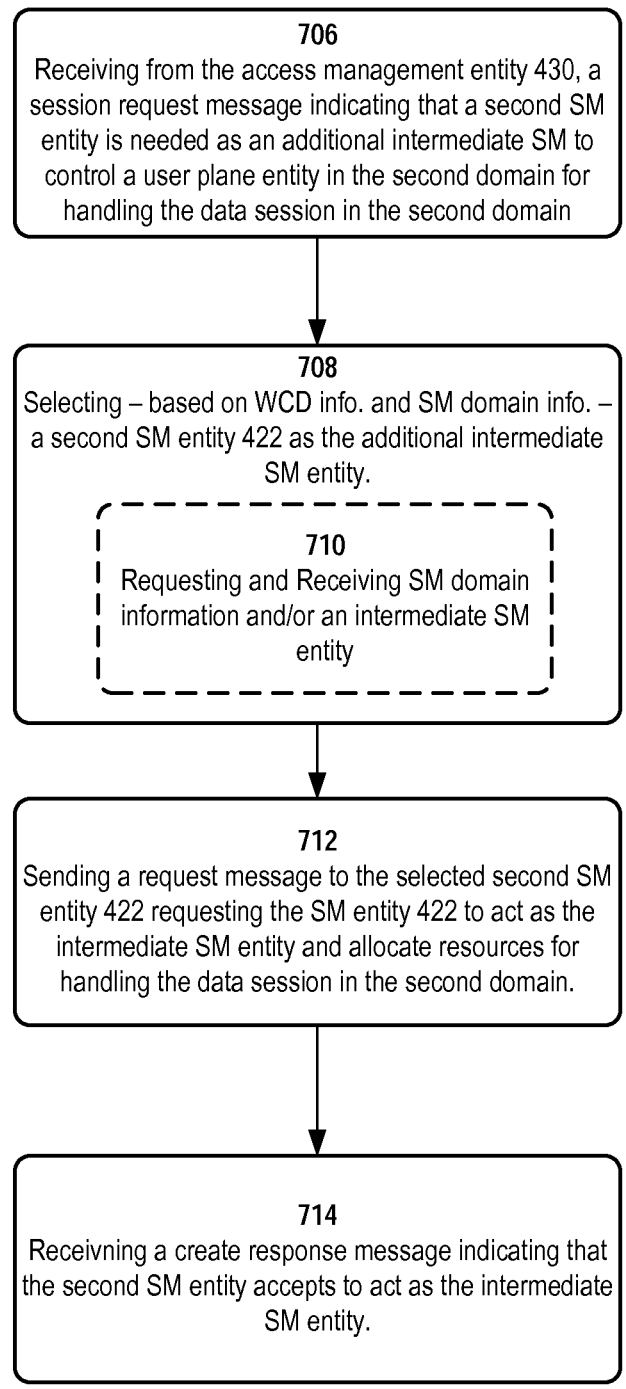

FIG. 10 is a flowchart illustrating actions 706, 708 (possibly including action 710), 712 and 716 performed by an Anchor Session Management entity 430, e.g. in the form of an anchor Session Management Function (A-SMF). These actions correspond to the actions with the same reference number 606, 608, 610 and 612 described above with reference to FIGS. 4 and 6.

FIG. 11a is a schematic block diagram of a network entity 20 (e.g., core network entity/function such as a AMF 430 or a A-SMF 420 or a I-SMF 422) according to some embodiments of the present disclosure. As illustrated, the network function 20 includes a control system 22 that includes circuitry comprising one or more processors 24 (e.g., Central Processing Units (CPUs), Application Specific Integrated Circuits (ASICs), Digital Signal Processors (DSPs), Field Programmable Gate Arrays (FPGAs), and/or the like) and memory 26. In the embodiment illustrated in FIG. 11a, the control system 22 also includes a network interface 28. In embodiments in which the network function 20 is a RAN, the network function 20 also includes one or more radio units 30 that each include one or more transmitters 32 and one or more receivers 34 coupled to one or more antennas 36. In some embodiments, the functionality of the network function 20 described above may be fully or partially implemented in software that is, e.g., stored in the memory 26 and executed by the processor(s) 24.

FIG. 11b is a schematic block diagram of a network entity 20 according to some other embodiments of the present disclosure. In this embodiment, the network entity 20 includes one or more modules 38, each of which is implemented in software. The module(s) 38 provide the functionality of the network entity 20 described herein.

Some embodiments described above can be summarised in the following manner:

One embodiment is directed to a method of selecting a SM entity for serving a WCD in a core network that comprises an access management entity serving the WCD and an anchor SM entity that controls a first user plane entity that handles a data session associated with the WCD in a first domain, and a second SM entity for controlling a second user plane entity in a second domain of the core network.

The method is performed in the access management entity and comprises:

selecting—based on WCD information indicating properties of the WCD and based on SM domain information at least indicating the user plane entities that are controlled by the first SM entity and the second SM entity respectively—the second SM entity as an additional intermediate SM entity to control a user plane entity in the second domain for handling the data session in the second domain;

sending, towards the second SM entity, a session request message requesting the second SM entity to act as the additional intermediate SM by allocating resources for handling the data session in the second domain;

receiving, in response to the session request message, a session response message indicating that the second SM entity has accepted to act as the additional intermediate SM entity.

The selecting may comprise:

sending a discovery request message towards a NRF entity requesting at least one of: the SM domain information; or an intermediate SM entity to control a user plane entity for handling the PDU session in the second domain;

receiving a discovery response message sent by the NRF entity (450), which response message comprises information indicating at least one of: the SM domain information; or information indicating a selected intermediate SM entity (422) to control a user plane entity for handling the PDU session in the second domain.

The first domain and the second domain may correspond to a first administrative domain and a second administrative domain respectively in a PLMN, or to an enterprise network and an general network respectively, or to a central network and a local network respectively.

The first user plane entity may have an interface towards a data network (DN) for communicating data between the WCD and the DN; and the second user plane entity may have an interface towards a RAN that serves the WCD.

The first SM entity may be an Anchor SM Function entity (e.g. A-SMF entity) and the first user plane entity may be an User Plane Function entity (e.g. UPF entity) that has an N6 interface towards a DN for communicating data between the WCD and the DN. The second session management entity may be an Intermediate Session Management Function entity (e.g. I-SMF entity) and the second user plane entity may be an UPF entity that has an N3 interface towards a RAN that serves the WCD.

The session request message may indicate that the second SM entity shall allocate resources by at least one of: selecting a user plane entity for handling the data session in the second domain; or allocating a data session context for handling the data session in the second domain.

One embodiment is directed to a method of selecting a SM entity for serving a WCD in a core network that comprises an access management entity serving the WCD and an anchor SM entity that controls a first user plane entity that handles a data session associated with the WCD in a first domain, and a second SM entity for controlling a second user plane entity in a second domain of the core network.

The method is performed in the anchor SM entity and comprises:

receiving a session request message sent by the access management entity, which message indicates that an additional intermediate SM entity is needed to control a user plane entity in the second domain for handling the data session in the second domain;

selecting, based on WCD information indicating properties of the WCD and based on SM domain information at least indicating the user plane entities that are controlled by the first SM entity and the second SM entity respectively, the second SM entity as the additional intermediate SM entity to control a user plane entity in the second domain for handling the data session in the second domain;

sending, towards the access management entity, a session response message indicating that the second SM entity shall be requested to act as the additional intermediate SM by allocating resources for handling the data session in the second domain.

The selecting may comprise:

sending a discovery request message towards a NRF entity requesting at least one of: the SM domain information; or an intermediate SM entity to control a user plane entity for handling the PDU session in the second domain;

receiving a discovery response message sent by the NRF entity, which response message comprises information indicating at least one of: the SM domain information; or information indicating a selected intermediate SM entity to control a user plane entity for handling the PDU session in the second domain.

The first domain and the second domain may correspond to a first administrative domain and a second administrative domain respectively in a PLMN, or to an enterprise network and an general network respectively, or to a central network and a local network respectively.

The first user plane entity may have an interface towards a DN for communicating data between the WCD and the DN; and the second user plane entity may have an interface towards a RAN that serves the WCD.

The first SM entity may be an anchor Session Management Function entity (e.g. A-SMF entity) and the first user plane entity may be an User Plane Function entity (e.g. UPF entity) that has an N6 interface towards a DN for communicating data between the WCD and the DN; and the second SM entity may be an intermediate Session Management Function entity (e.g. I-SMF entity) and the second user plane entity may be a UPF entity that has an N3 interface towards a RAN that serves the WCD.

The session response message may indicate that the second SM entity shall allocate resources by at least one of: selecting a user plane entity for handling the data session in the second domain; or allocating a data session context for handling the data session in the second domain.

One embodiment is directed to a method of selecting a SM entity for serving a WCD in a core network that comprises an access management entity serving the WCD and an anchor SM entity that controls a first user plane entity that handles a data session associated with the WCD in a first domain, and a second SM entity for controlling a second user plane entity in a second domain of the core network.

The method is performed in the anchor SM entity and comprises:

receiving a session request message sent by the access management entity, which message indicates that an additional intermediate SM entity is needed to control a user plane entity in the second domain for handling the data session in the second domain;

selecting—based on WCD information indicating properties of the WCD and based on SM domain information at least indicating the user plane entities that are controlled by the first SM entity and the second SM entity respectively—the second SM entity as the additional intermediate SM entity to control a user plane entity in the second domain for handling the data session in the second domain;

sending, towards the second SM entity, a session request message requesting the second SM entity to act as the additional intermediate SM by allocating resources for handling the data session in the second domain;

receiving, in response to the session request message, a session response message indicating that the second SM entity has accepted to act as the intermediate SM entity.

The selecting may comprise:

sending a discovery request message towards a NRF entity requesting at least one of: the SM domain information; or an intermediate SM entity to control a user plane entity for handling the PDU session in the second domain;

receiving a discovery response message sent by the NRF entity, which response message comprises information indicating at least one of: the SM domain information; or information indicating a selected intermediate SM entity to control a user plane entity for handling the PDU session in the second domain.

The first domain and the second domain may correspond to a first administrative domain and a second administrative domain respectively in a PLMN, or to an enterprise network and an general network respectively, or to a central network and a local network respectively.

The first user plane entity may have an interface towards a DN for communicating data between the WCD and the DN; and the second user plane entity may have an interface towards a RAN that serves the WCD.

The first SM entity may be an anchor Session Management Function entity (e.g. A-SMF entity) and the first user plane entity may be an User Plane Function entity (e.g. UPF entity) that has an N6 interface towards a DN for communicating data between the WCD and the DN; and the second SM entity may be an intermediate Session Management Function entity (e.g. I-SMF entity) and the second user plane entity may be an UPF entity that has an N3 interface towards a RAN that serves the WCD.

The session response message may indicate that the second SM entity shall allocate resources by at least one of: selecting a user plane entity for handling the data session in the second domain; or allocating a data session context for handling the data session in the second domain.

One embodiment is directed to an Access Management entity (AM entity) configured to operatively select a SM entity for serving a WCD in a core network that comprises the AM for serving the WCD (470), and the anchor SM entity (420) for controlling a first user plane entity (440) for handling a data session associated with the WCD in a first domain, and a second SM entity for controlling a second user plane entity in a second domain of the core network; the AM entity comprises at least one processor and memory comprising instructions executable by the at least one processor whereby the AM entity is operable to:

select—based on WCD information indicating properties of the WCD and based on SM domain information at least indicating the user plane entities that are controlled by the first SM entity and the second SM entity respectively—the second SM entity as an additional intermediate SM entity to control a user plane entity in the second domain for handling the data session in the second domain;

send, towards the second SM entity, a session request message requesting the second SM entity to act as the additional intermediate SM by allocating resources for handling the data session in the second domain;

receive, in response to the session request message, a session response message indicating that the second SM entity has accepted to act as the additional intermediate SM entity.

One embodiment is directed to an anchor SM entity (A-SM entity) configured to operatively select a SM entity for serving a WCD in a core network that comprises an access management entity for serving the WCD, and the anchor SM entity for controlling a first user plane entity for handling a data session associated with the WCD in a first domain, and a second SM entity for controlling a second user plane entity in a second domain of the core network.

The A-SM entity comprises at least one processor and memory comprising instructions executable by the at least one processor whereby the AM entity is operable to:
receive a session request message sent by the access management entity, which message indicates that an additional intermediate SM entity is needed to control a user plane entity in the second domain for handling the data session in the second domain;
select—based on WCD information indicating properties of the WCD and based on SM domain information at least indicating the user plane entities that are controlled by the first SM entity and the second SM entity respectively—the second SM entity as the additional intermediate SM entity to control a user plane entity in the second domain for handling the data session in the second domain;
send, towards the access management entity, a session response message indicating that the second SM entity shall be requested to act as the additional intermediate SM by allocating resources for handling the data session in the second domain.

One embodiment is directed to an anchor SM entity (A-SM entity) configured to operatively select a SM entity for serving a WCD in a core network that comprises an access management entity (AM entity) for serving the WCD, and the anchor SM entity for controlling a first user plane entity to handle a data session associated with the WCD in a first domain, and a second SM entity for controlling a second user plane entity in a second domain of the core network.

The A-SM entity comprises at least one processor and memory comprising instructions executable by the at least one processor whereby the AM entity (430) is operable to:
receive a session request message sent by the AM entity, which message indicates that a second SM entity is needed as an additional intermediate SM entity to control a user plane entity in the second domain for handling the data session in the second domain;
select—based on WCD information indicating properties of the WCD and based on SM domain information at least indicating the user plane entities that are controlled by the first SM entity and the second SM entity respectively—the second SM entity as the additional intermediate SM entity to control a user plane entity in the second domain for handling the data session in the second domain;
send, towards the second SM entity, a session request message requesting the second SM entity to act as the additional intermediate SM by allocating resources for handling the data session in the second domain;
receive, in response to the session request message, a session response message indicating that the second SM entity has accepted to act as the intermediate SM entity.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method of selecting a session management, SM, entity for serving a wireless communication device, WCD, in a core network, the method is performed by an access management entity in the core network and comprises:
determining that a first user plane entity and a second user plane entity are needed for a data session associated with the WCD, wherein the first user plane entity is configured to handle the data session in a first domain of the core network and the second user plane entity is configured to handle the data session in a second domain of the core network;
in response to determining that the first user plane entity and the second user plane entity are needed for the data session, selecting, based on WCD information indicating properties of the WCD and SM domain information at least indicating the first user plane entity and the second user plane entity that are controlled by a first SM entity and a second SM entity in the core network respectively, the second SM entity as an additional intermediate SM entity to control the second user plane entity in the second domain for handling the data session in the second domain;
sending, towards the second SM entity, a session request message requesting the second SM entity to act as the additional intermediate SM by allocating resources for handling the data session in the second domain; and
receiving, in response to the session request message, a session response message indicating that the second SM entity has accepted to act as the additional intermediate SM entity.

2. The method according to claim 1, wherein the selecting comprises:
sending a discovery request message towards a Network Repository Function, NRF, entity requesting at least one of: the SM domain information; or an intermediate SM entity to control a user plane entity for handling a Protocol Data Unit, PDU, session in the second domain; and
receiving a discovery response message sent by the NRF entity, which response message comprises information indicating at least one of: the SM domain information; or information indicating a selected intermediate SM entity to control a user plane entity for handling the PDU session in the second domain.

3. The method according to claim 1, wherein the first domain and the second domain correspond to a first administrative domain and a second administrative domain respectively in a public land mobile network, PLMN, or to an enterprise network and a general network respectively, or to a central network and a local network respectively.

4. The method according to claim 1, wherein:
the first user plane entity has an interface towards a data network, DN, for communicating data between the WCD and the DN; and
the second user plane entity has an interface towards a Radio Access Network, RAN, that serves the WCD.

5. The method according to claim 1, wherein:
the first SM entity is an anchor Session Management Function, A-SMF, entity and the first user plane entity is an User Plane Function, UPF, entity that has an N6 interface towards a data network, DN, for communicating data between the WCD and the DN; and the second session management entity is an intermediate Session Management Function, I-SMF, entity and the second user plane entity is an UPF entity that has an N3 interface towards a Radio Access Network, RAN, that serves the WCD.

6. The method according to claim 1, wherein the session request message indicates that the second SM entity shall allocate resources by at least one of: selecting a user plane entity for handling the data session in the second domain; or allocating a data session context for handling the data session in the second domain.

7. A method of selecting a session management, SM, entity for serving a wireless communication device, WCD, in a core network, the method is performed by an anchor SM entity in the core network and comprises:

receiving a session request message sent by an access management entity in response to the access management entity determining that a first user plane entity and a second user plane entity are needed for a data session associated with the WCD, wherein the first user plane entity is configured to handle the data session in a first domain of the core network and the second user plane entity is configured to handle the data session in a second domain of the core network, the session request message indicates that an additional intermediate SM entity is needed to control the second user plane entity in the second domain for handling the data session in the second domain;

selecting, based on WCD information indicating properties of the WCD and SM domain information at least indicating the first user plane entity and the second user plane entity that are controlled by the anchor SM entity and a second SM entity respectively, the second SM entity as the additional intermediate SM entity to control the second user plane entity in the second domain for handling the data session in the second domain; and sending, towards the access management entity, a session response message indicating that the second SM entity shall be requested to act as the additional intermediate SM by allocating resources for handling the data session in the second domain.

8. The method according to claim 7, wherein the selecting comprises:

sending a discovery request message towards a Network Repository Function, NRF, entity requesting at least one of: the SM domain information; or an intermediate SM entity to control a user plane entity for handling a Protocol Data Unit, PDU, session in the second domain; and receiving a discovery response message sent by the NRF entity, which response message comprises information indicating at least one of: the SM domain information; or information indicating a selected intermediate SM entity to control a user plane entity for handling the PDU session in the second domain.

9. The method according to claim 7, wherein the first domain and the second domain correspond to a first administrative domain and a second administrative domain respectively in a public land mobile network, PLMN, or to an enterprise network and a general network respectively, or to a central network and a local network respectively.

10. The method according to claim 7, wherein:

the first user plane entity has an interface towards a data network, DN, for communicating data between the WCD and the DN; and the second user plane entity has an interface towards a Radio Access Network, RAN, that serves the WCD.

11. The method according to claim 7, wherein:

the first SM entity is an anchor Session Management Function, A-SMF, entity and the first user plane entity is an User Plane Function, UPF, entity that has an N6 interface towards a data network, DN, for communicating data between the WCD and the DN; and the second SM entity is an intermediate Session Management Function, I-SMF, entity and the second user plane entity is an UPF entity that has an N3 interface towards a Radio Access Network, RAN, that serves the WCD.

12. The method according to claim 7, wherein the session response message indicates that the second SM entity shall allocate resources by at least one of: selecting a user plane entity for handling the data session in the second domain; or allocating a data session context for handling the data session in the second domain.

13. A method of selecting a session management, SM, entity for serving a wireless communication device, WCD, in a core network, the method is performed by an anchor SM entity in the core network and comprises:

receiving a session request message sent by an access management entity in response to the access management entity determining that a first user plane entity and a second user plane entity are needed for a data session associated with the WCD, wherein the first user plane entity is configured to handle the data session in a first domain of the core network and the second user plane entity is configured to handle the data session in a second domain of the core network, the session request message indicates that an additional intermediate SM entity is needed to control the second user plane entity in the second domain for handling the data session in the second domain;

selecting, based on WCD information indicating properties of the WCD and SM domain information at least indicating the first user plane entity and the second user plane entity that are controlled by the anchor SM entity and a second SM entity respectively, the second SM entity as the additional intermediate SM entity to control the second user plane entity in the second domain for handling the data session in the second domain;

sending, towards the second SM entity, a session request message requesting the second SM entity to act as the additional intermediate SM by allocating resources for handling the data session in the second domain; and receiving, in response to the session request message, a session response message indicating that the second SM entity has accepted to act as the intermediate SM entity.

14. The method according to claim 13, wherein the selecting comprises:

sending a discovery request message towards a Network Repository Function, NRF, entity requesting at least one of: the SM domain information; or an intermediate SM entity to control a user plane entity for handling a Protocol Data Unit, PDU, session in the second domain; and receiving a discovery response message sent by the NRF entity, which response message comprises information indicating at least one of: the SM domain information; or information indicating a selected intermediate SM entity to control a user plane entity for handling the PDU session in the second domain.

15. The method according to claim 13, wherein the first domain and the second domain correspond to a first administrative domain and a second administrative domain respectively in a public land mobile network, PLMN, or to an enterprise network and a general network respectively, or to a central network and a local network respectively.

16. The method according to claim 13, wherein:
the first user plane entity has an interface towards a data network, DN, for communicating data between the WCD and the DN; and
the second user plane entity has an interface towards a Radio Access Network, RAN, that serves the WCD.

17. The method according to claim 13, wherein:
the first SM entity is an anchor Session Management Function, A-SMF, entity and the first user plane entity is an User Plane Function, UPF, entity that has an N6 interface towards a data network, DN, for communicating data between the WCD and the DN; and
the second SM entity is an intermediate Session Management Function, I-SMF, entity and the second user plane entity is an UPF entity that has an N3 interface towards a Radio Access Network, RAN, that serves the WCD.

18. The method according to claim 13, wherein the session response message indicates that the second SM entity shall allocate resources by at least one of: selecting a user plane entity for handling the data session in the second domain; or allocating a data session context for handling the data session in the second domain.

19. An Access Management, AM, entity configured to operatively select a session management, SM, entity for serving a wireless communication device, WCD, in a core network, the AM entity comprises at least one processor and memory comprising instructions executable by the at least one processor whereby the AM entity is operable to:
determining that a first user plane entity and a second user plane entity are needed for a data session associated with the WCD, wherein the first user plane entity is configured to handle the data session in a first domain of the core network and the second user plane entity is configured to handle the data session in a second domain of the core network;
in response to determining that the first user plane entity and the second user plane entity are needed for the data session, select, based on WCD information indicating properties of the WCD and SM domain information at least indicating the first user plane entity and the second user plane entity that are controlled by a first SM entity and a second SM entity in the core network respectively, the second SM entity as an additional intermediate SM entity to control the second user plane entity in the second domain for handling the data session in the second domain;
send, towards the second SM entity, a session request message requesting the second SM entity to act as the additional intermediate SM by allocating resources for handling the data session in the second domain; and
receive, in response to the session request message, a session response message indicating that the second SM entity has accepted to act as the additional intermediate SM entity.

20. An anchor Session Management, A-SM, entity configured to operatively select a session management, SM, entity for serving a wireless communication device, WCD, in a core network, the A-SM entity comprises at least one processor and memory comprising instructions executable by the at least one processor whereby the A-SM entity is operable to:
receive a session request message sent by an access management entity, in response to the access management entity determining that a first user plane entity and a second user plane entity are needed for a data session associated with the WCD, wherein the first user plane entity is configured to handle the data session in a first domain of the core network and the second user plane entity is configured to handle the data session in a second domain of the core network, the session request message indicates that an additional intermediate SM entity is needed to control the second user plane entity in the second domain for handling the data session in the second domain;
select, based on WCD information indicating properties of the WCD and SM domain information at least indicating the first user plane entity and the second user plane entity that are controlled by the A-SM entity and a second SM entity respectively, the second SM entity as the additional intermediate SM entity to control the second user plane entity in the second domain for handling the data session in the second domain; and
send, towards the access management entity, a session response message indicating that the second SM entity shall be requested to act as the additional intermediate SM by allocating resources for handling the data session in the second domain.

21. An anchor Session Management, A-SM, entity configured to operatively select a session management, SM, entity for serving a wireless communication device, WCD, in a core network, the A-SM entity comprises at least one processor and memory comprising instructions executable by the at least one processor whereby the A-SM entity is operable to:
receive a session request message sent by an access management entity, in response to the access management entity determining that a first user plane entity and a second user plane entity are needed for a data session associated with the WCD, wherein the first user plane entity is configured to handle the data session in a first domain of the core network and the second user plane entity is configured to handle the data session in a second domain of the core network, the session request message indicates that an additional intermediate SM entity is needed to control the second user plane entity in the second domain for handling the data session in the second domain;
select, based on WCD information indicating properties of the WCD and SM domain information at least indicating the first user plane entity and the second user plane entity that are controlled by the A-SM entity and a second SM entity respectively, the second SM entity as the additional intermediate SM entity to control the second user plane entity in the second domain for handling the data session in the second domain;
send, towards the second SM entity, a session request message requesting the second SM entity to act as the additional intermediate SM and allocate resources for handling the data session in the second domain; and
receive, in response to the session request message, a session response message indicating that the second SM entity has accepted to act as the intermediate SM entity.

* * * * *

UNITED STATES PATENT AND TRADEMARK OFFICE
CERTIFICATE OF CORRECTION

PATENT NO. : 11,659,462 B2
APPLICATION NO. : 16/960430
DATED : May 23, 2023
INVENTOR(S) : Rommer et al.

It is certified that error appears in the above-identified patent and that said Letters Patent is hereby corrected as shown below:

In the Drawings

In Fig. 1, Sheet 1 of 11, delete "Fig 1" and insert -- Fig. 1 --, therefor.

In Fig. 2, Sheet 2 of 11, delete "Fig 2" and insert -- Fig. 2 --, therefor.

In Fig. 3, Sheet 3 of 11, delete "Fig 3" and insert -- Fig. 3 --, therefor.

In Fig. 4, Sheet 4 of 11, delete "Fig 4" and insert -- Fig. 4 --, therefor.

In Fig. 5, Sheet 5 of 11, delete "Fig 5" and insert -- Fig. 5 --, therefor.

In Fig. 6, Sheet 6 of 11, delete "Fig 6" and insert -- Fig. 6 --, therefor.

In Fig. 7, Sheet 7 of 11, delete "Fig 7" and insert -- Fig. 7 --, therefor.

In Fig. 8, Sheet 8 of 11, delete "Fig 8" and insert -- Fig. 8 --, therefor.

In Fig. 9, Sheet 9 of 11, delete "Fig 9" and insert -- Fig. 9 --, therefor.

In Fig. 10, Sheet 10 of 11, Tag "714", Line 1, delete "Receivning" and insert -- Receiving --, therefor.

In Fig. 10, Sheet 10 of 11, delete "Fig 10" and insert -- Fig. 10 --, therefor.

Figure 11:
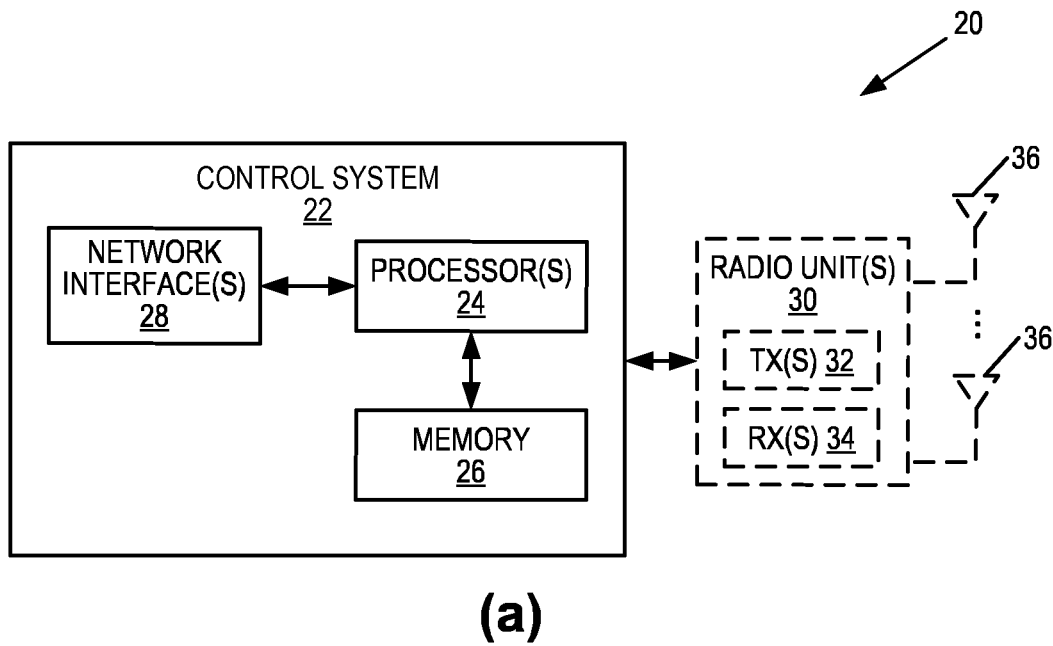
FIGS. 11a-11b are schematic block diagrams of a network entity according to some embodiments of the present disclosure.
Figure 11:
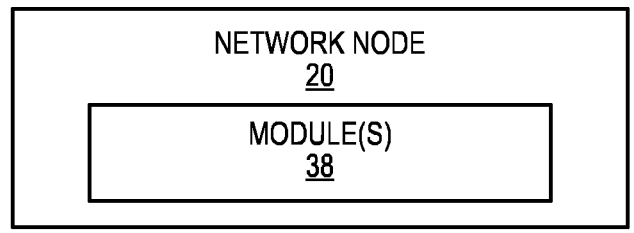

In Fig. 11, Sheet 11 of 11, delete "Fig 11" and insert -- Fig. 11 --, therefor.

Signed and Sealed this
Seventeenth Day of October, 2023

Katherine Kelly Vidal
*Director of the United States Patent and Trademark Office*